US009070191B2

(12) United States Patent
Murashita

(10) Patent No.: US 9,070,191 B2
(45) Date of Patent: Jun. 30, 2015

(54) APARATUS, METHOD, AND RECORDING MEDIUM FOR MEASURING DISTANCE IN A REAL SPACE FROM A FEATURE POINT ON THE ROAD

(75) Inventor: Kimitaka Murashita, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 623 days.

(21) Appl. No.: 13/345,945

(22) Filed: Jan. 9, 2012

(65) Prior Publication Data

US 2012/0213412 A1 Aug. 23, 2012

(30) Foreign Application Priority Data

Feb. 18, 2011 (JP) ................................ 2011-033756

(51) Int. Cl.
*G06K 9/00* (2006.01)
*G06T 7/00* (2006.01)

(52) U.S. Cl.
CPC .......... *G06T 7/0042* (2013.01); *G06K 9/00791* (2013.01); *G06T 7/0051* (2013.01); *G06T 2207/30244* (2013.01); *G06T 2207/30252* (2013.01); *G06K 9/00798* (2013.01)

(58) Field of Classification Search
None
See application file for complete search history.

(56) References Cited

U.S. PATENT DOCUMENTS

| | | | | | |
|---|---|---|---|---|---|
| 4,819,169 | A | * | 4/1989 | Saitoh et al. | 701/28 |
| 5,307,136 | A | * | 4/1994 | Saneyoshi | 356/3.14 |
| 5,414,474 | A | * | 5/1995 | Kamada et al. | 348/700 |
| 5,983,157 | A | | 11/1999 | Sugitani | |
| 6,163,022 | A | * | 12/2000 | Yasui et al. | 250/208.1 |
| 7,362,883 | B2 | * | 4/2008 | Otsuka et al. | 382/104 |
| 8,254,635 | B2 | * | 8/2012 | Stein et al. | 382/103 |
| 8,330,814 | B2 | * | 12/2012 | Matsuda et al. | 348/143 |
| 2002/0134151 | A1 | * | 9/2002 | Naruoka et al. | 73/291 |
| 2003/0103650 | A1 | * | 6/2003 | Otsuka et al. | 382/104 |
| 2003/0108222 | A1 | * | 6/2003 | Sato et al. | 382/104 |
| 2004/0057599 | A1 | | 3/2004 | Okada et al. | |
| 2005/0036660 | A1 | * | 2/2005 | Otsuka et al. | 382/104 |
| 2006/0078197 | A1 | * | 4/2006 | Mitsumoto et al. | 382/154 |

(Continued)

FOREIGN PATENT DOCUMENTS

| | | |
|---|---|---|
| JP | 8-43082 | 2/1996 |
| JP | 9-243389 | 9/1997 |

(Continued)

OTHER PUBLICATIONS

Marmoiton et al. "Location and relative speed estimation of vehicles by monocular vision", Oct. 34, 2000 IEEE Intelligent Vehicles Symposium 2000, pp. 227-232.*

(Continued)

*Primary Examiner* — Jason Heidemann
(74) *Attorney, Agent, or Firm* — Staas & Halsey LLP

(57) ABSTRACT

A storage medium storing a distance calculation program that causes a computer to execute operations, the operations includes; obtaining a first image captured by an image pickup device disposed on a vehicle; extracting a first feature point which satisfies an extraction condition used to determine a point on a road surface in the first image; and calculating a first distance from the first feature point to the image pickup device in a real space in accordance with data obtained by associating a position of the point in the first image and a first angle of the point viewed from a center of the image pickup device in the real space, and setting information including an angle of depression of the image pickup device and a distance between the image pickup device and the road surface.

20 Claims, 23 Drawing Sheets

(56) References Cited

U.S. PATENT DOCUMENTS

| | | | | |
|---|---|---|---|---|
| 2006/0111841 | A1* | 5/2006 | Tseng | 701/301 |
| 2006/0115126 | A1* | 6/2006 | Watanabe et al. | 382/106 |
| 2007/0154068 | A1* | 7/2007 | Stein et al. | 382/106 |
| 2008/0013790 | A1* | 1/2008 | Ihara et al. | 382/104 |
| 2008/0239076 | A1* | 10/2008 | Luo | 348/148 |
| 2009/0021609 | A1* | 1/2009 | Luo et al. | 348/241 |
| 2009/0290032 | A1* | 11/2009 | Zhang et al. | 348/211.9 |
| 2010/0033571 | A1* | 2/2010 | Fujita et al. | 348/149 |
| 2010/0104139 | A1* | 4/2010 | Kuehnle et al. | 382/106 |
| 2010/0309674 | A1* | 12/2010 | Su et al. | 362/466 |
| 2011/0298988 | A1* | 12/2011 | Kawai | 348/699 |
| 2011/0310245 | A1* | 12/2011 | Tsuchiya et al. | 348/135 |
| 2012/0127310 | A1* | 5/2012 | Kim | 348/148 |
| 2012/0269382 | A1 | 10/2012 | Kiyohara et al. | |

FOREIGN PATENT DOCUMENTS

| | | |
|---|---|---|
| JP | 10-123162 | 5/1998 |
| JP | 2003-178309 | 6/2003 |
| JP | 2004-32460 | 1/2004 |
| JP | 2007-240422 | 9/2007 |
| JP | 2009-205642 | 9/2009 |
| JP | 2009-266003 | 11/2009 |

OTHER PUBLICATIONS

Japanese Office Action issued Jul. 29, 2014 in corresponding Japanese Patent Application No. 2011-033756.

Japanese Office Action issued Feb. 3, 2015 in corresponding Japanese Patent Application No. 2011-033756.

* cited by examiner

FIG. 5A
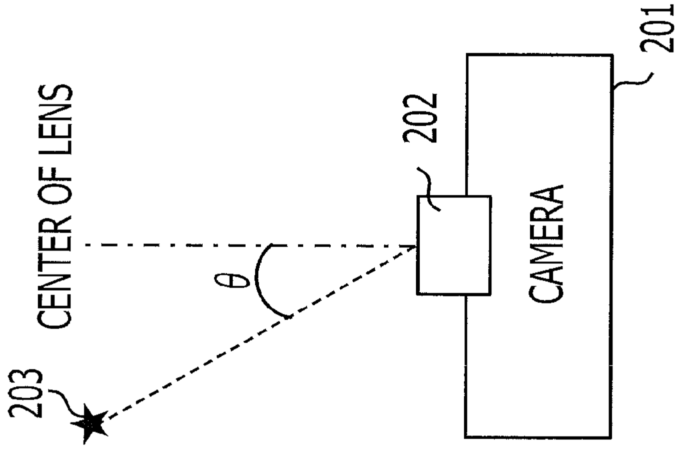
FIG. 5B
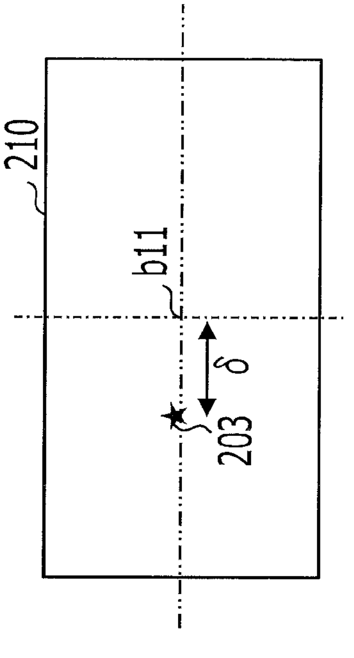
FIG. 5C
| δ | θ |
|---|---|
| 0 | 0 |
| 1 | 0.23 |
| 2 | 0.46 |
| 3 | 0.68 |
| 4 | 0.90 |
| 5 | 1.12 |
| 6 | 1.33 |
| : | : |

APARATUS, METHOD, AND RECORDING MEDIUM FOR MEASURING DISTANCE IN A REAL SPACE FROM A FEATURE POINT ON THE ROAD

CROSS-REFERENCE TO RELATED APPLICATION

This application is based upon and claims the benefit of priority of the prior Japanese Patent Application No.2011-33756, filed on Feb. 18, 2011, the entire contents of which are incorporated herein by reference.

FIELD

The present invention relates to a storage medium which stores a distance calculation program used to calculate a distance between a camera and an object in an image, and a distance calculation apparatus.

BACKGROUND

In recent years, various sensors are incorporated in vehicles. Examples of the sensors include a wheel-speed sensor which detects the number of rotations of wheels per second, a rudder-angle sensor which detects a degree of a turn of a steering wheel, and a yaw-rate sensor which detects a yaw speed of a vehicle. Information detected by such a sensor is supplied to a CAN (controller area network). A technique of calculating an amount of a travel distance of a vehicle by obtaining the information on the CAN has been used.

On the other hand, when the information on the CAN is used, there arise problems in that different companies employ different formats of the CAN, different types of vehicle have different information, some types of vehicle are not provided with sensors.

Accordingly, a technique of calculating a traveling amount of a vehicle using an image captured by a car-mounted camera without using the information on the CAN has been proposed. Examples of such a technique include a technique of detecting a general road sign included in an image captured by a car-mounted camera and calculating a speed of a vehicle in accordance with a size of the detected road sign. Furthermore, the examples include a technique of calculating a speed of a vehicle in accordance with a change of a position of a mark generated by mark generation means. These proposed techniques are disclosed in Japanese Laid-open Patent Publication No. 2009-205642 and Japanese Laid-open Patent Publication No. 10-123162.

SUMMARY

According to an aspect of the invention, a storage medium storing a distance calculation program that causes a computer to execute operations, the operations includes; obtaining a first image captured by an image pickup device disposed on a vehicle; extracting a first feature point which satisfies an extraction condition used to determine a point on a road surface in the first image; and calculating a first distance from the first feature point to the image pickup device in a real space in accordance with data obtained by associating a position of the point in the first image and a first angle of the point viewed from a center of the image pickup device in the real space, and setting information including an angle of depression of the image pickup device and a distance between the image pickup device and the road surface.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 5A to 5C are diagrams illustrating distortion characteristics of a lens;

DESCRIPTION OF EMBODIMENTS

In techniques in the related art, when an image of a general road sign is not obtained, a vehicle speed is not calculated. Therefore, the technique in the related art lacks versatility since cases where the technique is applicable are limited.

Furthermore, the technique in the related art lacks versatility since the vehicle should be provided with mark generation means used to generate a mark on a road surface.

Therefore, to attain versatility, calculation of a distance between an object and a camera in an image in a real space is considered. When the distance between an object and a camera in a real space is calculated, a traveling amount of the vehicle may be obtained in accordance with an amount of a change in time of the distance.

However, there arise problems in that, when the distance between the object in the image and the camera is to be calculated in the real space, the object should be selected in the captured image and a method for obtaining a distance from the object should be determined.

Accordingly, it is an object of the present invention to provide a storage medium which stores a distance calculation program used to appropriately specify an object to be used for distance calculation in an image and appropriately calculate a distance from the object to a camera and a distance calculation apparatus.

Embodiments of the present invention will be described hereinafter with reference to the accompanying drawings.

First Embodiment

Configuration

Figure 1:
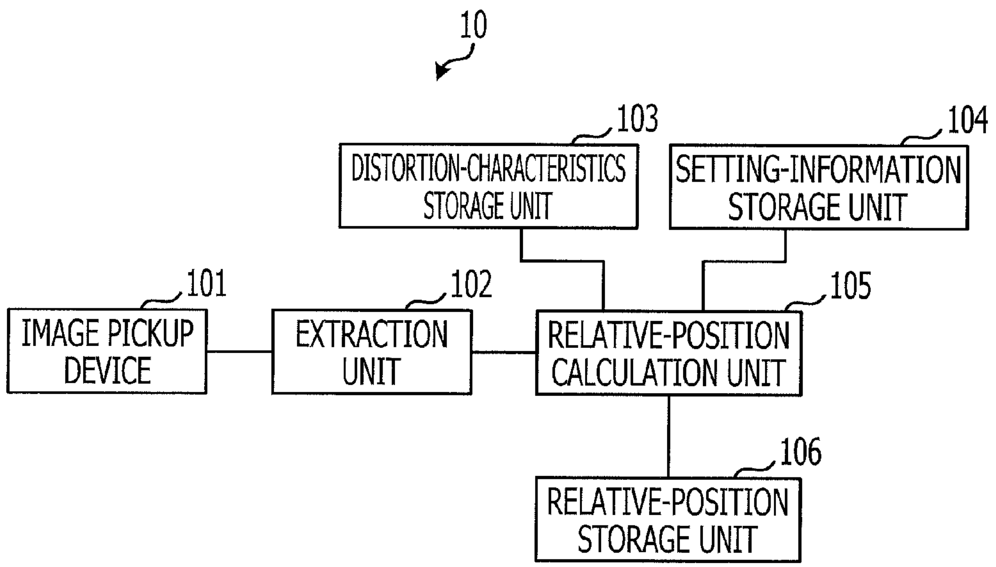
FIG. 1 is a block diagram illustrating a configuration of a distance calculation apparatus according to a first embodiment.

FIG. 1 is a block diagram illustrating a configuration of a distance calculation apparatus 10 according to a first embodiment. In the example shown in FIG. 1, the distance calculation apparatus 10 includes an image pickup device 101, an extraction unit 102, a distortion-characteristics storage unit 103, a setting-information storage unit 104, a relative-position calculation unit 105, and a relative-position storage unit 106. Note that the image pickup device 101 may not be included in the distance calculation apparatus 10. In this case, the image pickup device 101 and the distance calculation apparatus 10 communicate with each other to transmit/receive information.

The image pickup device 101 is a CCD camera including an NTSC (National Television System Committee) output and captures images including images of a road surface in a regular interval. For example, when the image pickup device 101 captures 30 images per second, the regular interval is 1/30seconds. Captured images are supplied to the extraction unit 102. The image pickup device 101 is installed in a vehicle.

The extraction unit 102 obtains an image from the image pickup device 101 and extracts a feature point which satisfies an extraction condition defined for feature points on a road surface included in the image. Examples of the feature point on the road surface include a feature point of an object on the road surface. The reason the feature point on the road surface is extracted will be described hereinafter with reference to FIG. 6.

Examples of the object include a road sign (a pedestrian crossing, a stop line, a center line, a lane edge, and an instruction sign such as "stop"), a manhole, a lid of a drain outlet, and a parking line on the road surface. Examples of the feature point include an edge of a road sign, text on a manhole, or an edge of a pattern of a manhole.

Alternatively, the extraction unit 102 may extract a feature point from an installation surface defined by a construction and a road surface. For example, the extraction unit 102 may extract an edge stone of a sidewalk, a pole of a guard rail, or an installation surface defined by a construction such as a telephone pole and a road surface as a feature point. Furthermore, the extraction unit 102 may extract a feature point from a line which defines an installation surface when a car stop is installed on a road surface or a line of an installation surface defined by a pole in an indoor parking lot and a floor.

When detecting a stop line selected from among various road signs, the extraction unit 102 uses a white-line detection technique using Hough transform. Furthermore, the extraction unit 102 may detect a character string such as "stop", a manhole, or a lid of a drain outlet by checking a shape and a color thereof against a dictionary, i.e., by pattern matching.

The extraction unit 102 recognizes a sidewalk, a guard rail, or a telephone pole by the pattern matching, and determines a boundary point in which a vertical edge of such a construction disappears and a horizontal edge appears as a feature point. In this way, the extraction unit 102 extracts a feature point on the road surface.

Alternatively, the extraction unit 102 may define, in advance, shifts of portions in a video image corresponding to coordinates in the image at a time of traveling of a vehicle, eliminates feature points which are positioned in some of the coordinates and shifts of which are considerably different from the defined shifts, and determines the other feature points as feature points on the road surface.

Since all feature point candidates have shift amounts of 0 when the vehicle stops, for example, the extraction unit 102 determines that the vehicle has been stopped when to the shift amounts are 0. When some of the feature point candidates shift while most of the feature point candidates have stopped, the extraction unit 102 determines that the feature point candidates are included in a moving object. Then, such feature point candidates are eliminated.

Next, when the vehicle starts moving, the vehicle moves slowly. A threshold value for shifts of the feature points at this time is set in the extraction unit 102 for each coordinate. Since a 3D object is nearer to the vehicle than an object located on the road surface, a shift of the 3D object is larger when viewed from the vehicle. When a shift of a feature point obtained immediately after the vehicle moves (after 100 ms, for example) is equal to or larger than an expected shift, the extraction unit 102 removes the feature point as a feature point of the 3D object. After a certain period has been elapsed, the extraction unit 102 determines that an extracted feature point is included in the feature points of the object on the road surface and the extracted feature point may be used for distance calculation.

The extraction unit 102 extracts feature points using one of the extraction conditions described above. The extraction unit 102 may extract feature points using a plurality of extraction conditions. For example, first, the extraction unit 102 detects a stop line by Hough transform and extracts a corner of the stop line, for example, as feature points. However, when the stop line is not detected by Hough transform, the extraction unit 102 may perform pattern matching so as to extract feature points by detecting the object on the road surface.

Alternatively, the extraction unit 102 may generate a minified image from the obtained image and extract feature points which satisfy the extraction condition from the minified image. By this, feature points may be extracted after noise is removed.

Furthermore, the extraction unit 102 may set an extraction region from which points are to be extracted as feature points in advance. The extraction region is set in accordance with a vanishing point and a horizon. The vanishing point is a point at infinity in which opposite lines of the road surface intersect with each other. The horizon is opposite lines of the road surface. The vanishing point is determined in accordance with a focus point of the camera, and the horizon is determined in accordance with distortion characteristics of a lens of the camera. Furthermore, the extraction region may be roughly a certain rectangular region located on a lower portion of the image.

As for the extraction region, a line located below the vanishing point and the horizon by certain pixels may be determined as an upper limit and a line located above the lower portion of the image by certain pixels may be determined as a lower limit. The "certain pixels" is 20 pixels, for example. The line located below the vanishing point and the horizon by the certain pixels is determined as an upper boundary line of the extraction region since the horizon and the vanishing point vertically shift in a slope, for example.

Figure 2:
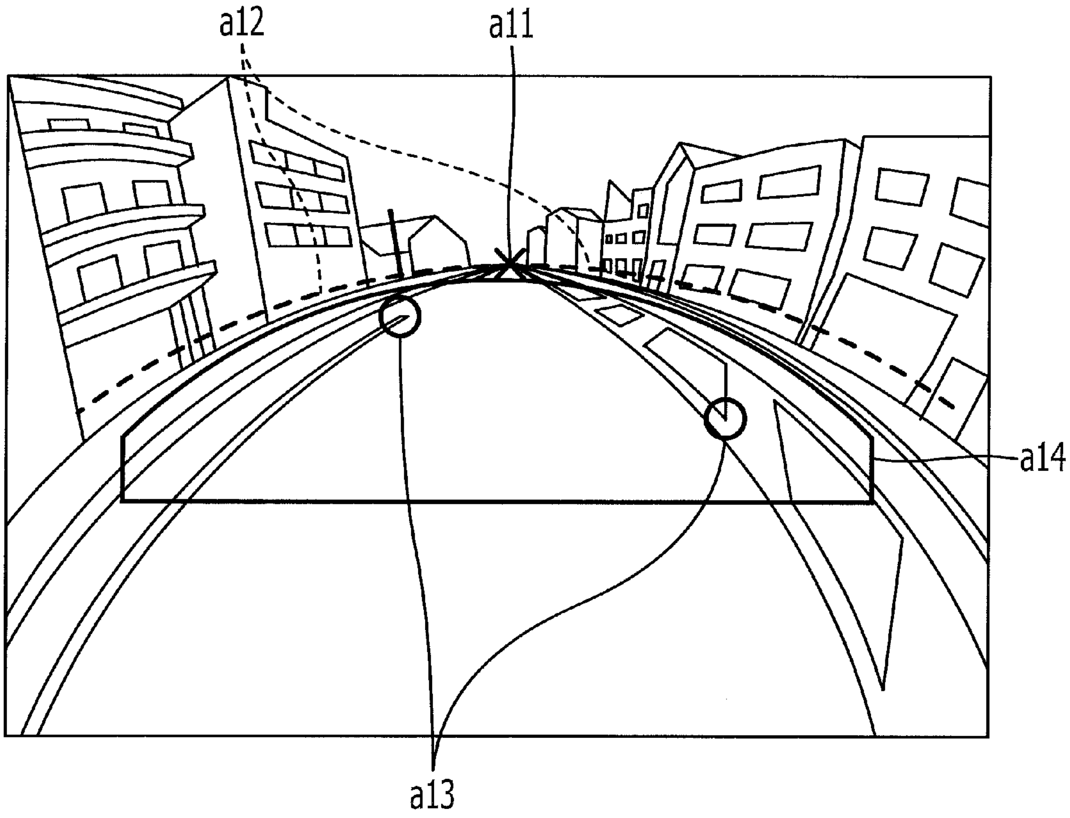
FIG. 2 is a diagram illustrating an extraction region.

FIG. 2 is a diagram illustrating the extraction region. An image shown in FIG. 2 is captured by a camera disposed in a front portion of the vehicle. In FIG. 2, a reference symbol "a11" denotes a vanishing point and a reference symbol "a12" denoted a horizon. Furthermore, a reference symbol "a14" denotes an extraction region and a reference symbol "a13" denotes candidates of feature points included in the extraction region. The extraction unit 102 extracts a feature point from the extraction region a14. For example, a corner of a white line or a corner made of white lines is extracted as a feature point. Since performing extraction only on the extraction region, the extraction unit 102 easily finds an object on a road surface while reducing an amount of calculation.

Figure 3A:
FIGS. 3A and 3B are diagrams illustrating feature points.
Figure 3B:
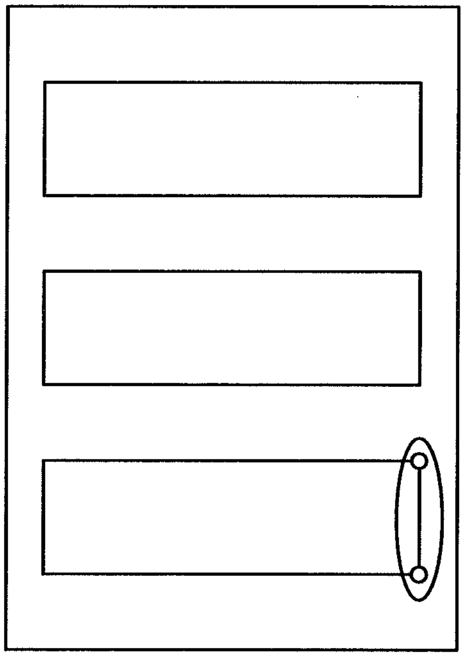

FIGS. 3A and 3B are diagrams illustrating feature points. In FIG. 3A, an edge of a character written on a road surface is set as a feature point. In an image shown in FIG. 3A, a lower left edge of "S" in a character string "STOP" written on the road surface is extracted as a feature point. In FIG. 3B, corners of a white line of a pedestrian crossing written on the road surface are set as feature points. In an image shown in FIG. 3B, opposite corners of a left edge of the white line written on the road surface are extracted as two feature points. The extraction unit 102 outputs the extracted feature points to the relative-position calculation unit 105.

Note that the extraction unit 102 extracts a plurality of feature points located in various portions in the extraction region in a distribution manner. By this, risk of errors of the extraction of feature points can be reduced. The extraction unit 102 divides the extraction region into a plurality of regions and extracts feature points from the regions so that the feature points located in distributed portions can be extracted from the extraction region. Furthermore, when a large number of feature points are extracted, noise can be reduced by statistical processing.

Referring back to FIG. 1, the distortion-characteristics storage unit 103 stores information on distortion characteristics of a lens of the image pickup device 101. Here, characteristics of the camera will be described. Objects located on the same line extending from a center of the camera are captured by the camera in the same direction in a video image (or as an image) irrespective of distances from the camera in the real space.

Figure 4A:
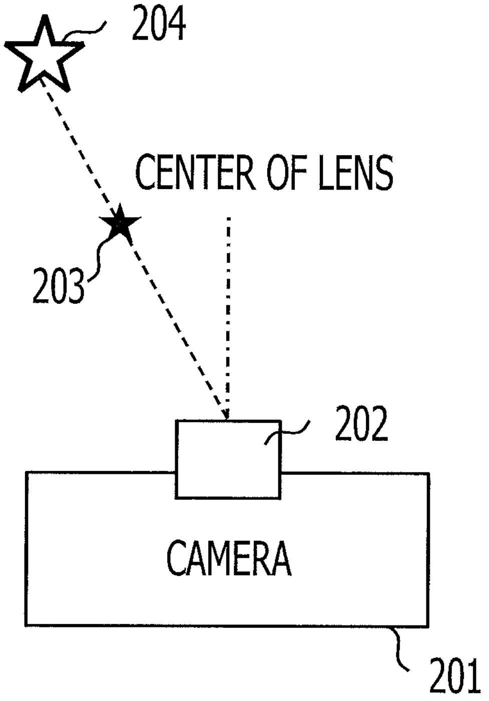
FIGS. 4A and 4B are diagrams illustrating positions of objects in an image.
Figure 4B:
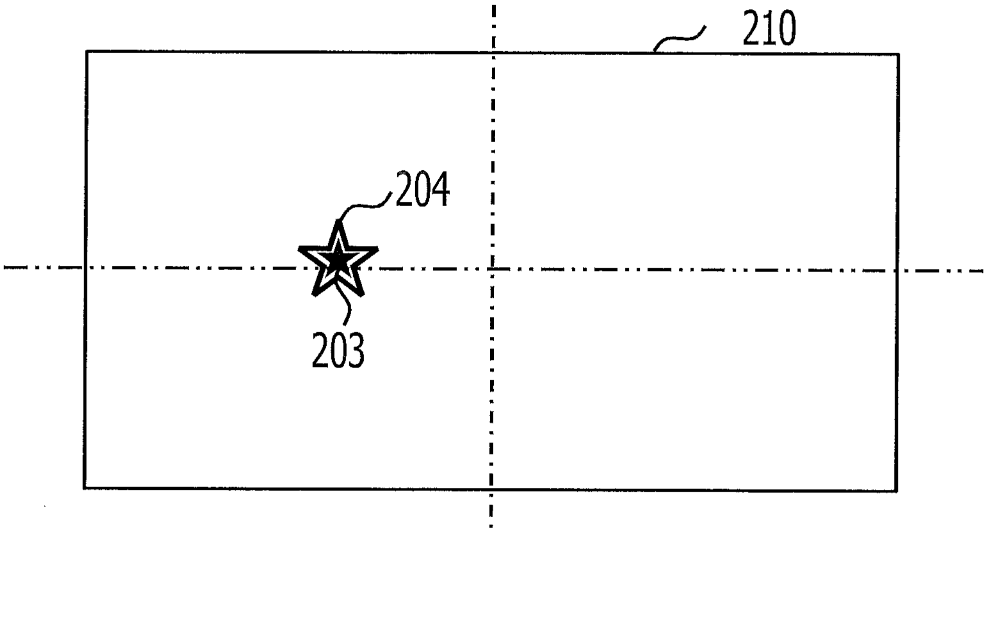

FIGS. 4A and 4B are diagrams illustrating positions of objects in an image. In FIG. 4A, the positional relationship among a camera 201 and objects 203 and 204 is viewed from above. As shown in FIG. 4A, the objects 203 and 204 are positioned on the same line extending from a center of a lens 202. An image captured in a state shown in FIG. 4A is shown in FIG. 4B. In an image 210 shown in FIG. 4B, the objects 203 and 204 are captured as if the objects 203 and 204 are located in the same position.

Data representing the relationship described in FIGS. 4A and 4B is distortion characteristics of the lens. FIGS. 5A to 5C are diagrams illustrating the distortion characteristics of the lens 202 of the camera 201. FIG. 5A is a diagram illustrating an angle θ defined by the line extending from the center of the lens 202 and the object 203.

FIG. 5B is a diagram illustrating a distance δ from a center b11 of the image to the object 203 in the image. FIG. 5C is a diagram illustrating the relationship between the angle θ and the distance δ. The relationship shown in FIG. 5C represents the distortion characteristics of the lens 202. In the example shown in FIG. 5C, the distortion characteristics of the lens 202 is stored in a lookup table. The distance δ may be represented by the number of pixels counted from the center b11.

Furthermore, the distortion characteristics of the lens 202 includes a rate of a vertical distortion to a horizontal distortion. Using the rate of the vertical distortion to the horizontal distortion, the relationship between a vertical distance from the center b11 of the image and a vertical angle of the camera can be associated with each other. By synthesizing the vertical and horizontal distortion characteristics, an angle of the object positioned at an arbitrary coordinate (x, y) relative to a center of a video image in a 3D real space can be calculated using the relative-position storage unit 106 which will be described hereinafter.

Note that, as the lens distortion characteristics, the relationship between the number of pixels from the center b11 of the image and the angle θ is obtained when a high-quality lens having no distortion is used. The data representing the lens distortion characteristics is also referred to as distortion data.

The distortion-characteristics storage unit 103 stores the data representing the lens distortion characteristics. For example, the distortion-characteristics storage unit 103 stores the lookup table shown in FIG. 5C. Note that the data representing the lens distortion characteristics is read using the relative-position calculation unit 105 where appropriate.

Referring back to FIG. 1, the setting-information storage unit 104 stores setting information representing a camera setting position. The setting information includes a height from the road surface, an angle of depression, a pan angle, and a roll angle. The height from the road surface represents a distance from the road surface to the camera 201, the angle of depression represents an angle defined by the horizon and a sight-line direction of the camera 201, the pan angle represents an angle of the camera 201 in a lateral direction, and the roll angle represents a rotation angle of the camera 201. The setting information is read by the relative-position storage unit 106 where appropriate.

The relative-position calculation unit 105 calculates a distance from the camera to the feature point in accordance with the position of the feature point extracted by the extraction unit 102 relative to the center of the image, the distortion characteristics, and the setting information. For example, the relative-position calculation unit 105 obtains the angle θ using the position of the feature point in the image and the distortion characteristics.

The relative-position calculation unit 105 calculates an angle λ defined by the object or the feature point of the object and the position in which the camera is installed in accordance with the obtained angle θ and the angle of depression, the pan angle, and the roll angle included in the setting information.

The relative-position calculation unit 105 calculates a distance from the object including the feature point to the camera by assigning the angles θ and λ and a parameter of the setting information to a trigonometric function.

Figure 6:
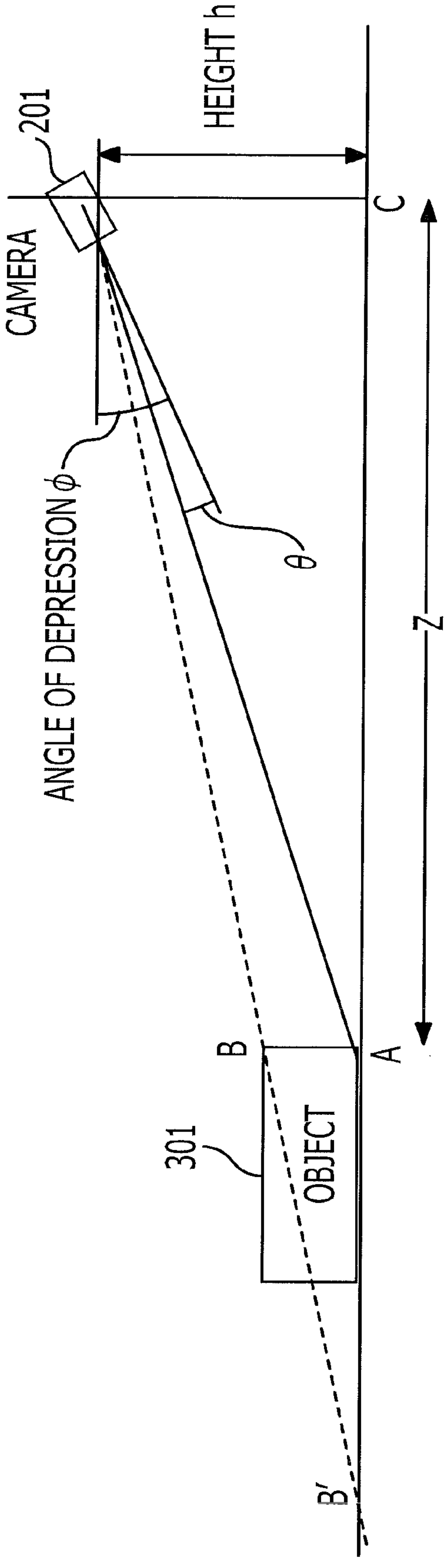
FIG. 6 is a diagram illustrating distance calculation.

FIG. 6 is a diagram illustrating the distance calculation. In the example shown in FIG. 6, a distance Z in a longitudinal direction in a side view is calculated while the roll angle and the pan angle are set to 0 for simplicity. In the example shown in FIG. 6, in the setting information of the camera, a height from the road surface is denoted by "h" and an angle of depression is denoted by "ϕ". An angle defined by the center of the lens and a feature point A of the object obtained in accordance with a position of the feature point A and the distortion characteristics is denoted by "θ". The feature point A of the object is positioned on the road surface.

The relative-position calculation unit 105 calculates the distance Z from the camera to the feature point A of the object by Expression (1) in accordance with the height h from the road surface, the angle of depression ϕ, and the angle θ.

$$Z=h\times\tan(90°-\phi+\theta) \quad (1)$$

The relative-position calculation unit 105 may calculate the distance Z from the feature point of the object to the camera 201 in the real space (3D real space) by combining distances in left and right directions when viewed from above.

Since the feature point A of the object is positioned on the road surface, the relative-position calculation unit 105 calculates the distance Z by Expression 1. However, when a point which is not on the road surface is extracted as a feature point B, for example, a distance between a point B' and a point C is calculated instead of the distance Z. The point C represents an intersection between the road surface and a line orthogonally extending from the camera 201 to the road surface. Therefore, the relative-position calculation unit 105 may not calculate the distance Z from the feature point B of the object to the camera if a height AB of the object has not been obtained in advance.

Accordingly, in this embodiment (and other embodiments described below), the object from which the feature point is to be extracted is determined as an object having a height from the road surface of approximately 0. Furthermore, in this embodiment, not only the object having the height from the road surface of approximately 0 but also a feature point included in the installation surface defined by the object and the road surface may be extracted. The relative-position calculation unit 105 outputs the calculated angle θ, the calculated angle λ, and the calculated distance Z of the feature point as a relative position in the real space to the relative-position storage unit 106.

Referring back to FIG. 1, the relative-position storage unit 106 stores the relative position of the object in the real space which is associated with a time point when the image is captured. The information representing the relative position is displayed in a display unit or used for calculation of a traveling amount which will be described hereinafter in the following embodiments.

Operation

Figure 7:
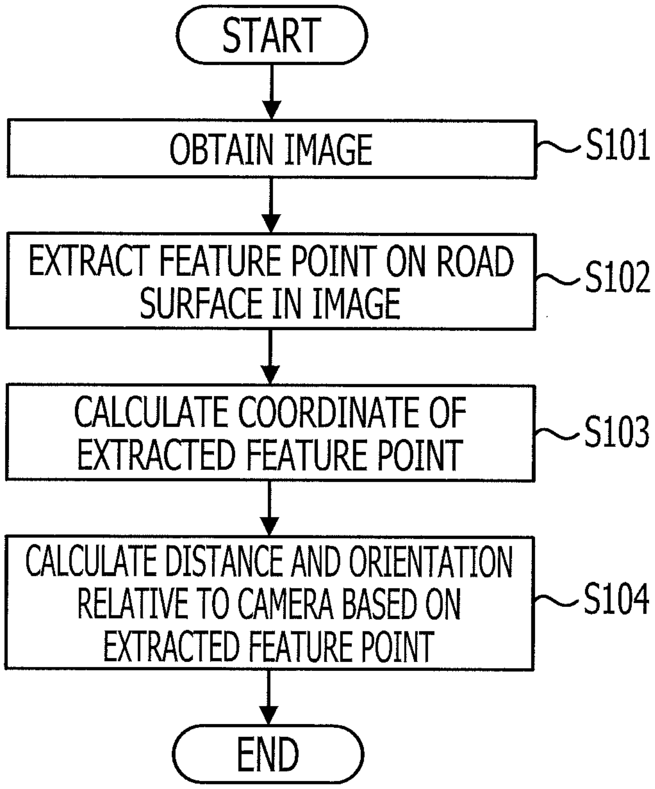
FIG. 7 is a flowchart illustrating a distance calculation process according to the first embodiment.

Next, operation of the distance calculation apparatus 10 of the first embodiment will be described. FIG. 7 is a flowchart illustrating a distance calculation process according to the first embodiment. In operation S101 of FIG. 7, the extraction unit 102 obtains an image captured by the image pickup device 101.

In operation S102, the extraction unit 102 extracts a feature point on the road surface included in the obtained image. The extraction unit 102 extracts at least one feature point which satisfies the extraction condition from the extraction region on the road surface, for example.

In operation S103, the relative-position calculation unit 105 calculates at least one coordinate representing at least one position of the at least one feature point extracted by the extraction unit 102.

In operation S104, the relative-position calculation unit 105 calculates a distance between the extracted at least one feature point and the camera 201 and an orientation (angle) in accordance with the coordinate of the feature point, the distortion characteristics, and the setting information. The calculated distance and the calculated orientation are stored in the relative-position storage unit 106.

As described above, according to the first embodiment, since the feature point of the object on the road surface included in the image captured by the camera 201 is focused on, an appropriate distance from the object to the camera 201 may be calculated. Accordingly, since a distance between an object to a camera may be appropriately obtained when a feature point on a road surface or an installation surface defined by the road surface and the object is provided, application of this embodiment is not limited and high versatility is attained.

Second Embodiment

Next, a distance calculation apparatus 20 according to a second embodiment will be described. In the second embodiment, a traveling amount of a vehicle is calculated using at least two images captured at different time points. The distance calculation apparatus 20 calculates a traveling amount of a vehicle, and therefore, serves as a traveling-amount calculation apparatus.

Configuration

Figure 8:
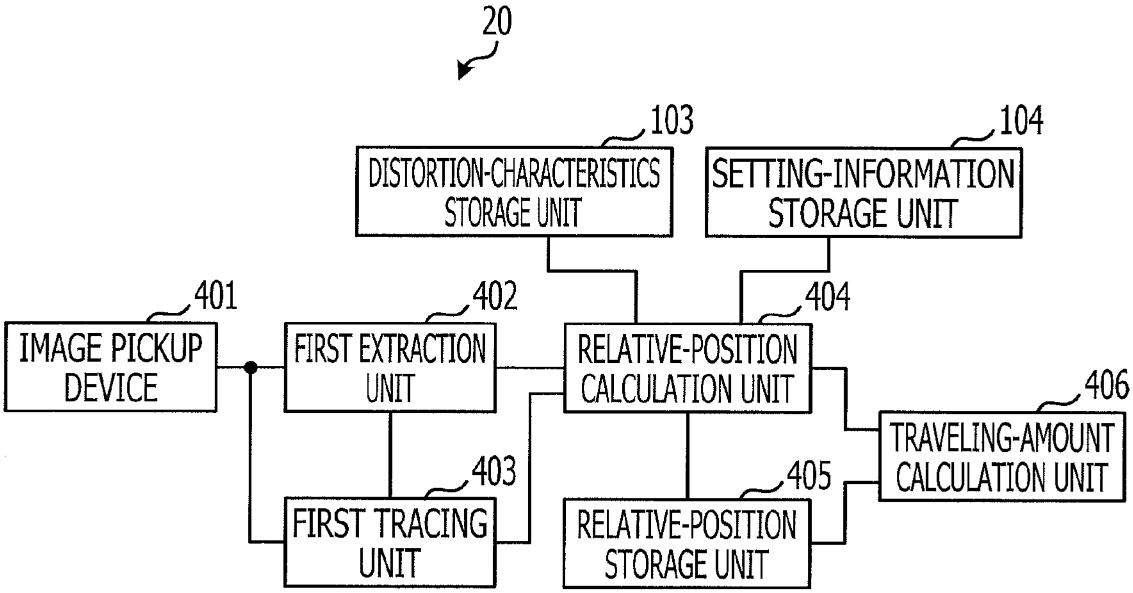
FIG. 8 is a block diagram illustrating a configuration of a distance calculation apparatus according to a second embodiment.

FIG. 8 is a block diagram illustrating a configuration of the distance calculation apparatus (traveling-amount calculation apparatus) 20 according to the second embodiment. The distance calculation apparatus 20 shown in FIG. 8 includes an image pickup device 401, a first extraction unit 402, a distortion-characteristics storage unit 103, a setting-information storage unit 104, a first tracing unit 403, a relative-position calculation unit 404, a relative-position storage unit 405, and a traveling-amount calculation unit 406. In the configuration shown in FIG. 8, components the same as those shown in FIG. 1 are denoted by reference numerals the same as those shown in FIG. 1, and descriptions thereof are omitted.

The image pickup device 401 is a camera disposed in a front portion of a vehicle, for example. The image pickup device 401 captures a road surface in a regular interval and supplies a captured image to the first extraction unit 402 and the first tracing unit 403. It is assumed that an image captured at a time point t0 is a first image and an image captured at a time point t1 is a second image.

As with the first embodiment, the first extraction unit 402 extracts a feature point on the road surface included in the image obtained from the image pickup device 401. Furthermore, the first extraction unit 402 supplies the extracted feature point to the first tracing unit 403 and the relative-position calculation unit 404.

The first tracing unit 403 determines whether a feature point which is included in the first image captured at the time point t0 and which is extracted by the first extraction unit 402 corresponds to a feature point which is included in the second image captured at the time point t1 and which is extracted by the first extraction unit 402. A process of the determination may be performed by tracing the object and the feature point.

The first tracing unit 403 recognizes the object using the feature point included in the first image, for example. Then, the first tracing unit 403 performs tracing to obtain a position of the object in the second image captured at the time point t1. Then, the first tracing unit 403 obtains a coordinate of the feature point included in the object in the second image. Note that the first tracing unit 403 may notify the relative-position calculation unit 404 of the feature point in the second image corresponding to the feature point in the first image so that the relative-position calculation unit 404 obtains the coordinate of the feature point in the second image.

In the tracing process, the object recognized in the first image is used as a template, for example, and a position of the object in the second image is determined by template matching. Furthermore, in the tracing process, a KLT (Kanade Lucas Tomasi) method, a Moravec operator, a Harris operator, or any other general feature-point matching process may be performed to trace a feature point. After extracting a plurality of feature points which satisfy a condition from the second image, the first tracing unit 403 selects one of the feature points which corresponds to a certain feature point included in the first image and outputs a coordinate of the selected feature point to the relative-position calculation unit 404.

The first tracing unit 403 may set a tracing region on which the trace of the feature point is to be performed which is larger than an extraction region from which the feature point is to be extracted. By this, even if a feature point is moved out of an extraction region of a previous image at a next time point, this feature point is traceable. Note that the tracing region serves as an extraction region from which a feature point is extracted from the second image.

As with the first embodiment, the relative-position calculation unit 404 calculates a distance and an orientation (angle) from the feature point to the camera in accordance with the position of the feature point included in the first image, distortion characteristics, and setting information.

Furthermore, as described above, the relative-position calculation unit 404 calculates a distance and an orientation (angle) from the feature point to the camera in a real space in accordance with the position of the feature point included in the second image, the distortion characteristics, and the setting information. The relative-position calculation unit 404 supplies the obtained distance and the obtained orientation to the relative-position storage unit 405 and the traveling-amount calculation unit 406.

Figure 9A:
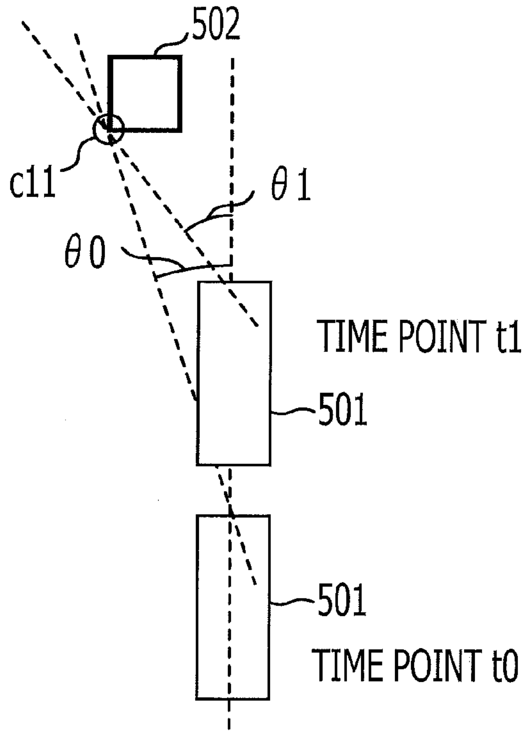
FIGS. 9A to 9C are diagrams illustrating tracks of a vehicle when the vehicle travels straight.
Figure 9B:
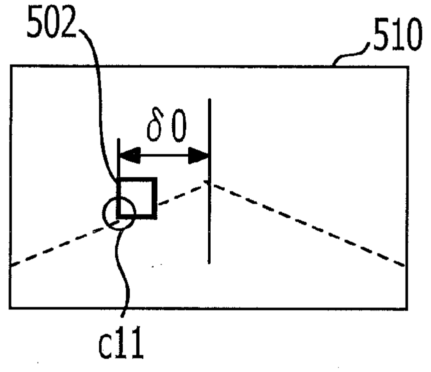
Figure 9C:
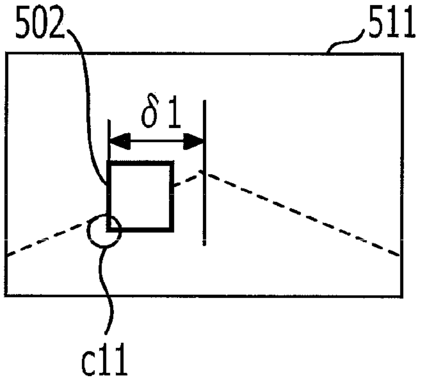

FIGS. 9A and 9C are diagrams illustrating tracks of a vehicle when the vehicle travels straight. FIG. 9A is a diagram illustrating the relationship between a movement of a vehicle 501 which travels straight and an object. A camera is disposed in a center front of the vehicle 501. FIG. 9B is an image diagram of an image 510 captured at the time point t0. FIG. 9C is an image diagram of an image 511 captured at the time point t1. The first extraction unit 402 which has a function of extracting a feature point from an image extracts a feature point c11 of an object 502 positioned on a road surface, for example.

The relative-position calculation unit 404 calculates a distance $\delta_0$ from the feature point c11 to a center of the image 510 using the image 510 and calculates an angle $\theta_0$ in accordance with the distance $\delta_0$, the distortion characteristics, and the setting information. Furthermore, the relative-position calculation unit 404 calculates a distance from the feature point c11 to the camera using a trigonometric function in accordance with the angle $\theta_0$ and the setting information. The angle $\theta_0$ of the feature point viewed from the camera is referred to as an orientation hereinafter.

The relative-position calculation unit 404 causes the first tracing unit 403 to specify the feature point c11 in the image 511 which is obtained at the time point t1 and which corresponds to the feature point c11 obtained at the time point t0. Thereafter, the relative-position calculation unit 404 processes the feature point c11 similarly to the feature point c11 obtained at the time point t0 so as to obtain a distance and an orientation.

Referring back to FIG. 8, the relative-position storage unit 405 associates the distances and the orientations supplied from the relative-position calculation unit 404 with the time points. For example, the relative-position storage unit 405 stores the distance and the orientation at the time point t0 and thereafter stores the distance and the orientation at the time point t1.

The traveling-amount calculation unit 406 calculates a traveling amount of the vehicle in accordance with an amount of change of the feature point in time in the different images. When the vehicle travels straight, the traveling-amount calculation unit 406 may calculate a traveling speed of the vehicle by dividing a difference between the distance of the feature point at the time point t0 and the distance of the feature point at the time point t1 by a difference between the time points t0 and t1. Note that the traveling amount may include a traveling direction in addition to a traveling distance. In this case, the traveling amount is represented by a vector.

Figure 10:
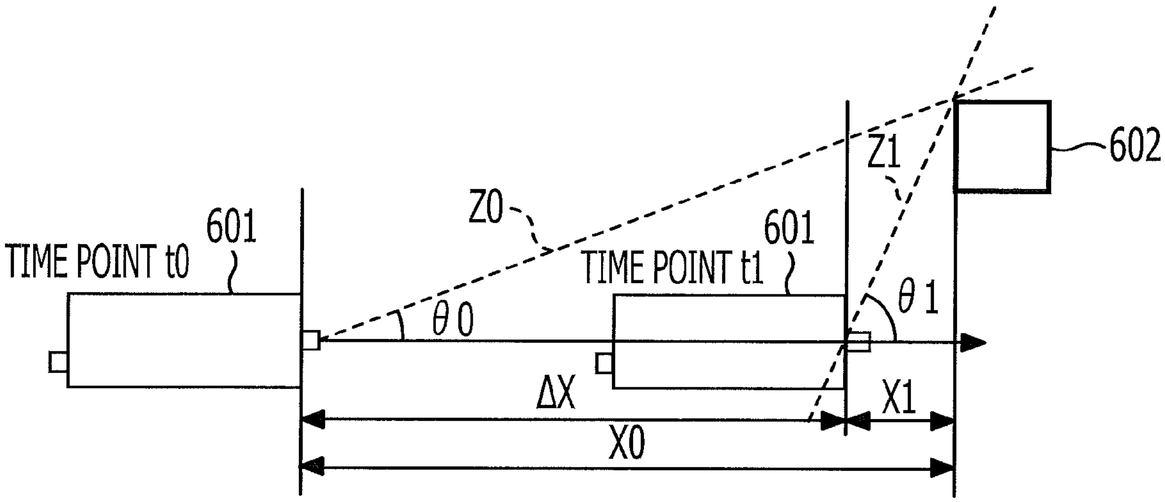
FIG. 10 is a diagram illustrating a traveling-amount calculation process when the vehicle travels straight.

FIG. 10 is a diagram illustrating a traveling-amount calculation process when a vehicle travels straight. In the example shown in FIG. 10, a distance from a vehicle 601 to an object 602 obtained at the time point t0 is denoted by $Z_0$, an angle at the time point t0 is denoted by $\theta_0$, a distance from the vehicle 601 to the object 602 obtained at the time point t1 is denoted by $Z_1$, and an angle at the time point t1 is denoted by $\theta_1$. Distances $X_0$ and $X_1$ obtained at the time points $t_0$ and $t_1$, respectively, to the object 602 in a normal direction of a camera is obtained by the following expressions.

$$X_0=Z_0 \cos \theta_0 \tag{2}$$

$$X_1=Z_1 \cos \theta_1 \tag{3}$$

The traveling-amount calculation unit 406 calculates a traveling distance $|\Delta X|$ from the time point t0 to the time point t1.

$$|\Delta X|=|Z_1 \cos \theta_1-Z_0 \cos \theta_0| \tag{4}$$

The traveling-amount calculation unit 406 divides the traveling distance by a time-point difference (t1−t0) to obtain a traveling speed v of the vehicle. Furthermore, the traveling-amount calculation unit 406 consecutively obtains traveling speeds at a regular interval so as to obtain a change of the speed to thereby calculate an acceleration speed. For example, the interval is 100 ms.

Note that, if obtaining traveling speeds in a plurality of feature points, the traveling-amount calculation unit 406 obtains an average traveling speed after removing traveling speeds which are apparently outliers when compared with the average traveling speed.

The traveling-amount calculation unit 406 displays the obtained traveling amount in a display unit of the vehicle so as to notify a driver of a speed of the vehicle. Furthermore, accuracies of some speed measurement devices installed in vehicles are low or are not ensured when the vehicle travels at low speed. In this embodiment, even when the vehicle travels at low speed such as 10 km/h, for example, an appropriate speed may be calculated.

Operation

Figure 11:
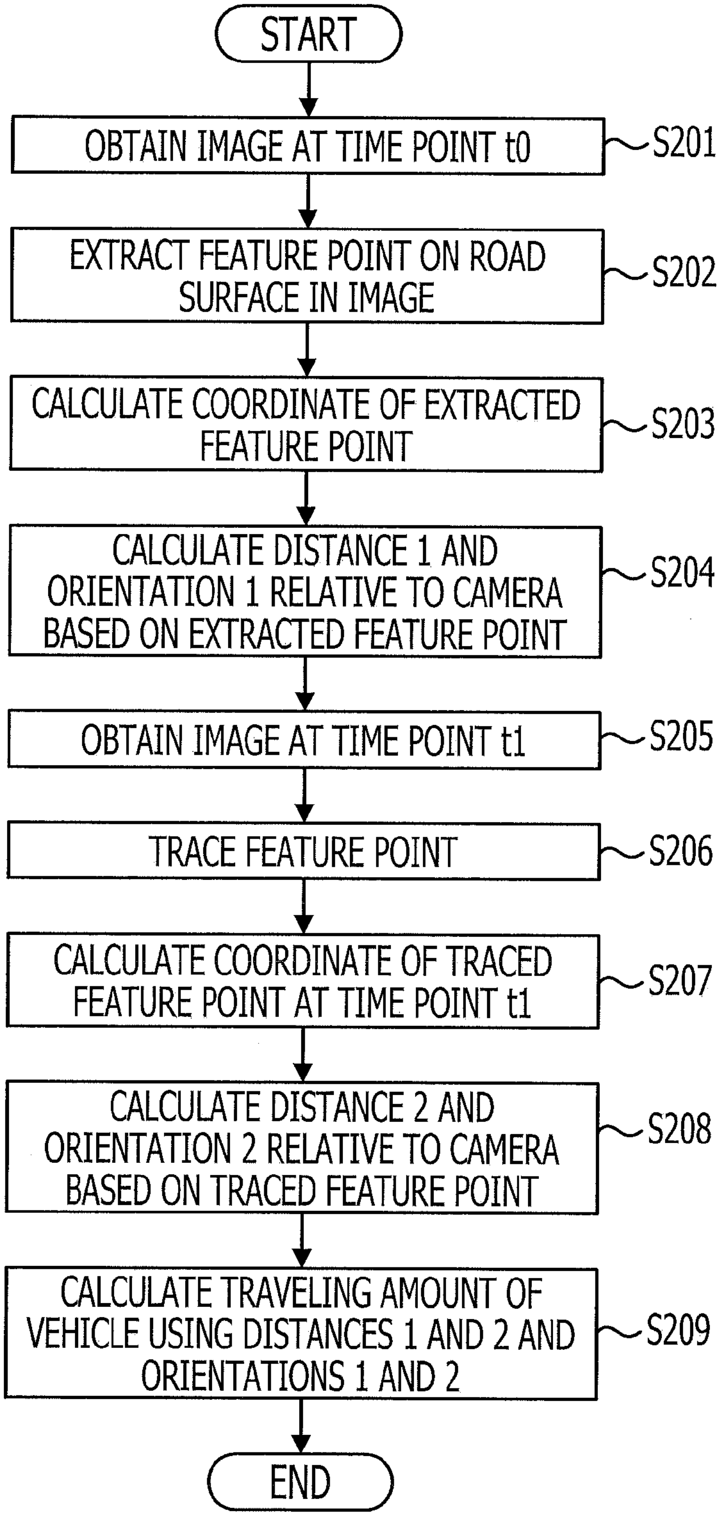
FIG. 11 is a flowchart illustrating a traveling-amount calculation process according to the second embodiment.

Next, operation of the distance calculation apparatus 20 of the second embodiment will be described. FIG. 11 is a flowchart illustrating the traveling-amount calculation process according to the second embodiment. In operation S201 of FIG. 11, the first extraction unit 402 obtains a first image captured by the image pickup device 401 at the time point t0.

In operation S202, the first extraction unit 402 extracts a feature point on the road surface included in the obtained first image. The first extraction unit 402 extracts at least one feature point which satisfies an extraction condition from an extraction region included in the image, for example.

In operation S203, the relative-position calculation unit 404 calculates at least one coordinate representing at least one position of the at least one feature point extracted by the first extraction unit 402.

In operation S204, the relative-position calculation unit 404 calculates a distance 1 between the extracted at least one feature point and a camera and an orientation (angle) 1 in accordance with the coordinate of the feature point, distortion characteristics, and setting information. The calculated distance 1 and the calculated orientation 1 are stored in the relative-position storage unit 405 after being associated with the time point t0.

In operation S205, the first extraction unit 402 obtains a second image captured by the image pickup device 401 at the time point t1.

In operation S206, the first tracing unit 403 determines whether the feature point of the first image corresponds to a feature point of the second image. For example, the first tracing unit 403 performs a process of tracing the feature point included in the first image on the second image. The tracing process is performed by the template matching process, the feature-point matching process, or the like as described above.

In operation S207, the relative-position calculation unit 404 calculates at least one coordinate representing at least one position of the at least one feature point extracted by the first tracing unit 403.

In operation S208, the relative-position calculation unit 404 calculates a distance 2 between the extracted at least one feature point and the camera and an orientation (angle) 2 in accordance with the coordinate of the feature point, the distortion characteristics, and the setting information. The calculated distance 2 and the calculated orientation 2 are stored in the relative-position storage unit 405 after being associated with the time point t1.

In operation S209, the traveling-amount calculation unit 406 calculates a traveling amount of the vehicle which travels straight in accordance with the distances 1 and 2 and the orientations 1 and 2. A method for the calculation has been described above with reference to FIG. 10.

As described above, according to the second embodiment, the traveling amount of the vehicle which travels straight may be calculated in accordance with the distance to the object and the amount of change of orientation with time which are appropriately calculated. According to the second embodiment, a case where a traveling amount is calculated is not limited and a traveling amount at a time of a low speed may also be appropriately calculated.

Third Embodiment

Next, a distance calculation apparatus 30 according to a third embodiment will be described. In the third embodiment, a determination as to whether a vehicle is traveling straight or rounding a curve is made and a traveling amount is obtained in accordance with the determination. The distance calculation apparatus 30 has a function of calculating a traveling amount, and therefore, serves as a traveling-amount calculation apparatus.

Configuration

Figure 12:
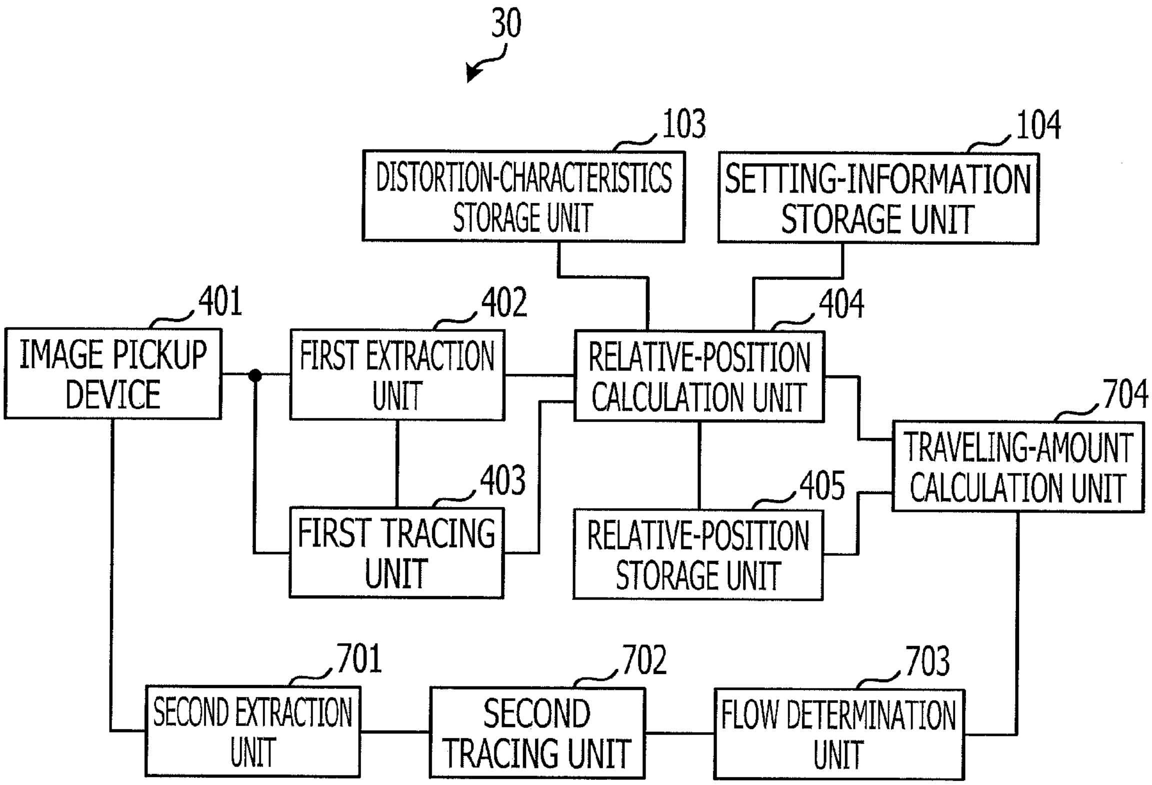
FIG. 12 is a block diagram illustrating a configuration of a distance calculation apparatus according to a third embodiment.

FIG. 12 is a block diagram illustrating a configuration of the distance calculation apparatus (traveling-amount calculation apparatus) 30 according to the third embodiment. In the example shown in FIG. 12, the distance calculation apparatus 30 includes an image pickup device 401, a first extraction unit 402, a first tracing unit 403, a distortion-characteristics storage unit 103, a setting-information storage unit 104, a relative-position calculation unit 404, a relative-position storage unit 405, a second extraction unit 701, a second tracing unit 702, a flow determination unit 703, and a traveling-amount calculation unit 704. In the configuration shown in FIG. 12, components the same as those shown in FIGS. 1 and 8 are denoted by reference numerals the same as those shown in FIGS. 1 and 8, and descriptions thereof are omitted.

The second extraction unit 701 shown in FIG. 12 obtains an image captured by the image pickup device 401. Here, the image obtained by the second extraction unit 701 may be the same as that output to the first extraction unit 402 and the first tracing unit 403 or may be an image captured immediately before or after the image output to the first extraction unit 402 and the first tracing unit 403.

The second extraction unit 701 extracts, as feature points, a plurality of points having luminance which is considerably different from that of surrounding points, the difference being larger than a predetermined threshold value, from the image, for example. In this case, it is not necessarily the case that the extracted feature points are points on a road surface. The second extraction unit 701 extracts feature points every time the second extraction unit 701 obtains an image from the image pickup device 401 and supplies the extracted feature points to the second tracing unit 702.

The second tracing unit 702 traces the same feature points of the same object in a real space among different images obtained at different time points so as to obtain positions of the feature points in the different images. The extraction of feature points and the tracing process are performed by the KLT method, the Moravec operator, or the like as described above. The second tracing unit 702 outputs traveling amounts of the traced feature points to the flow determination unit 703. The traveling amounts of the traced feature points are referred to as motion vectors.

The flow determination unit 703 determines whether the vehicle is traveling straight or rounding a curve in accordance with magnitudes of lateral components of the obtained motion vectors. The lateral components of the motion vectors are referred to as lateral vectors.

Figure 13:
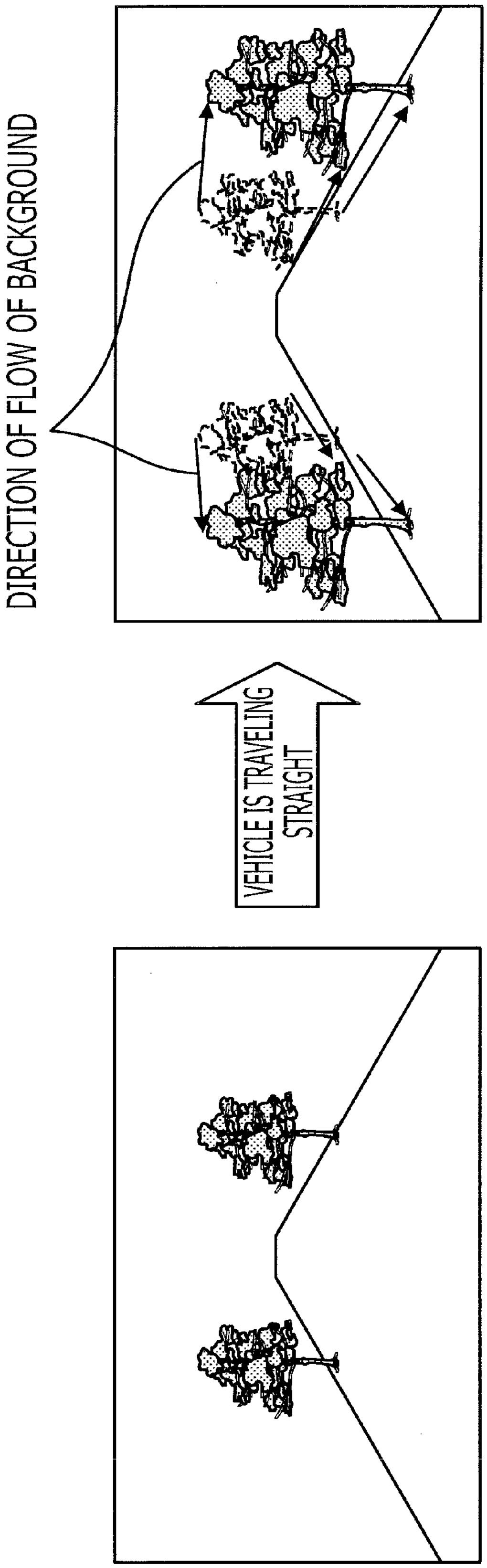
FIG. 13 is a diagram illustrating a flow of a background when a vehicle travels straight.

FIG. 13 is a diagram illustrating an optical flow of a background when the vehicle travels straight. As shown in FIG. 13, when objects are captured by a camera disposed in a front portion of the vehicle which is traveling straight, the objects are viewed as if the objects move from the center to the left and right.

Figure 14:
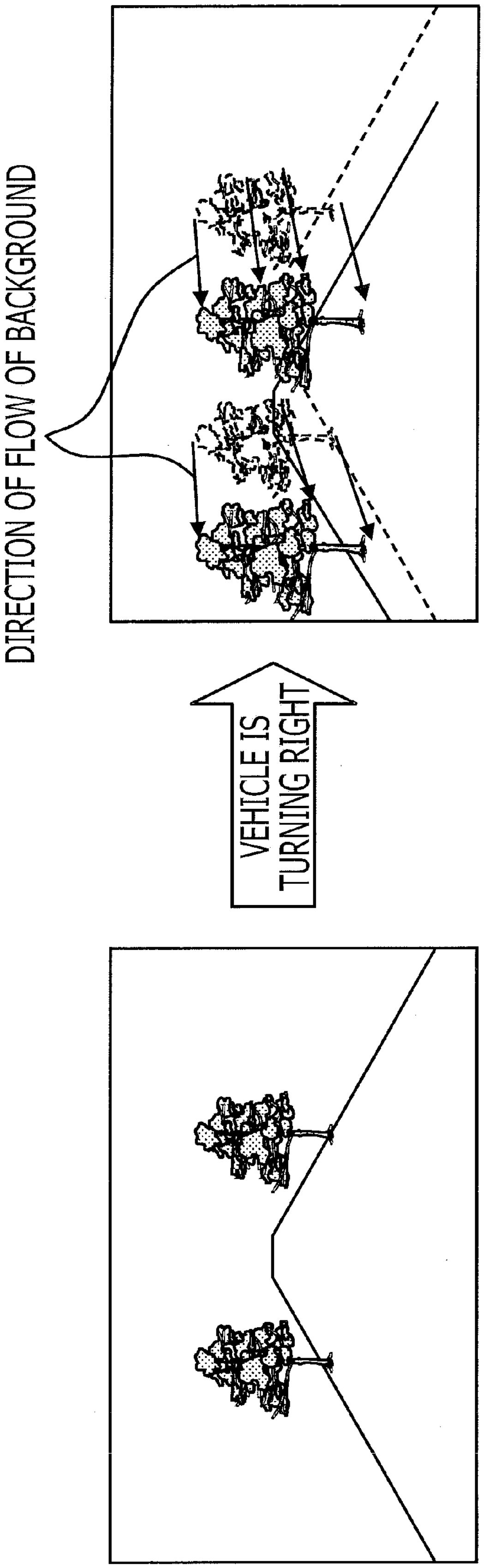
FIG. 14 is a diagram illustrating a flow of the background when the vehicle turns right.

FIG. 14 is a diagram illustrating an optical flow of a background when the vehicle turns right. As shown in FIG. 14, when objects are captured by a camera disposed in a front portion of the vehicle which is turning right, the objects are viewed as if the objects move to the left. A movement of the vehicle is determined using the relationship of the optical flows shown in FIGS. 13 and 14. The movement of the vehicle represents a movement of a vehicle which is traveling straight or a movement of a vehicle which is turning right.

Figure 15A:
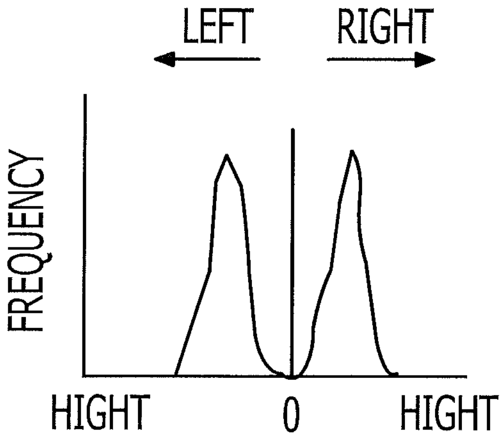
FIGS. 15A and 15B are diagrams illustrating frequency distribution of lateral vectors.
Figure 15B:
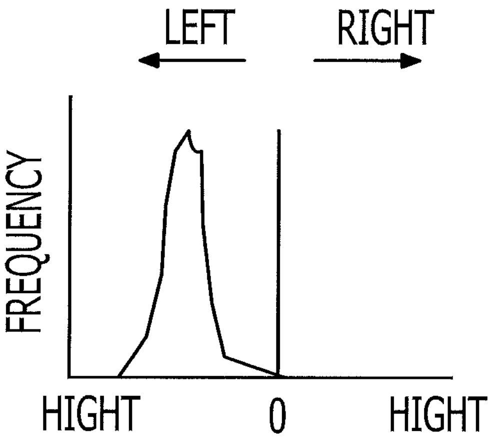

The flow determination unit 703 generates frequency distribution of the lateral vectors so as to determine whether the vehicle is traveling straight or the vehicle is rounding a curve. FIGS. 15A and 15B are diagrams illustrating the frequency distribution of the lateral vectors. FIG. 15A shows an example of frequency distribution obtained when the vehicle travels straight. As shown in FIG. 15A, when the frequency distribution substantially has diphasic, the flow determination unit 703 determines that the vehicle is traveling straight.

FIG. 15B shows an example of frequency distribution obtained when the vehicle turns right. As shown in FIG. 15B, when the frequency distribution substantially has monomodality, the flow determination unit 703 determines that the vehicle is turning a curve. The flow determination unit 703 determines that the vehicle is turning right when the monomodality is included in a left-oriented region whereas the flow determination unit 703 determines that the vehicle is turning left when the monomodality is included in a right-oriented region.

Referring back to FIG. 12, the traveling-amount calculation unit 704 determines whether a traveling amount at a time when the vehicle is traveling straight or a traveling amount at a time when the vehicle is rounding a curve is obtained in accordance with a result of the determination performed by the flow determination unit 703. The traveling-amount calculation unit 704 calculates the traveling amount by a calculation method corresponding to the determined movement of the vehicle. The traveling-amount calculation unit 704 calculates the traveling amount at the time when the vehicle is traveling straight by the calculation method described in the second embodiment.

Figure 16A:
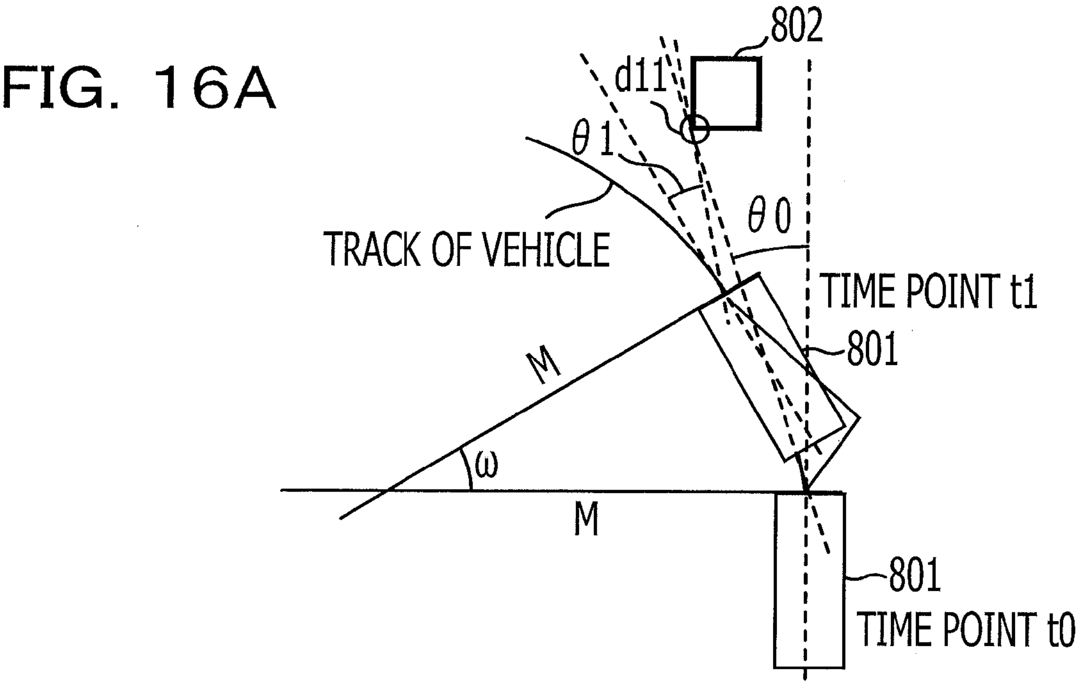
FIGS. 16A to 16C are diagrams illustrating tracks of the vehicle when the vehicle rounds a curve.
Figure 16B:
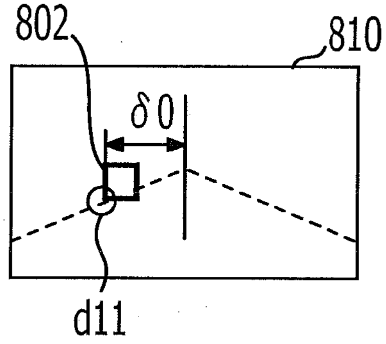
Figure 16C:
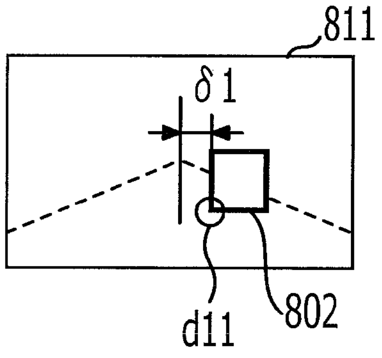

The method for calculating the traveling amount when the vehicle is rounding a curve will be described. FIGS. 16A and 16C are diagrams illustrating tracks of a vehicle when the vehicle is rounding a curve. In the example shown in FIG. 16A, a vehicle 801 turns left. In this case, a camera is disposed in a front portion of the vehicle 801. FIG. 16B is an image diagram of an image 810 captured at a time point t0. FIG. 16C is an image diagram of an image 811 captured at a time point t1.

As with the foregoing embodiment, using the image 810 obtained at the time point t0, the relative-position calculation unit 404 calculates an angle $\theta_0$ in accordance with a distance $\delta_0$ from a center of the image to a feature point d11 of an object 802. As with the foregoing embodiment, using the image 811 obtained at the time point t1, the relative-position calculation unit 404 calculates an angle $\theta_1$ in accordance with a distance $\delta_1$ from a center of the image to the feature point d11 of the object 802.

The traveling-amount calculation unit 704 calculates a rotation radius M and a turning angle ω when the vehicle is turning left in accordance with the relationship shown in FIG. 16A. To obtain the rotation radius M and the turning angle ω, feature points of at least two objects are used.

Figure 17A:
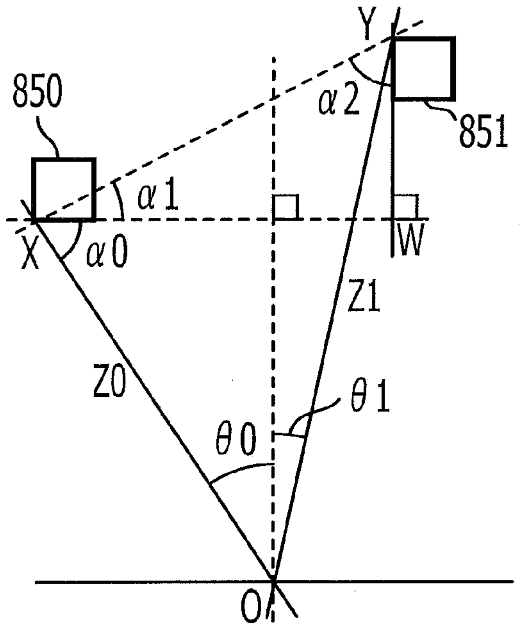
FIGS. 17A to 17D are diagrams illustrating calculation of a traveling amount of the vehicle when the vehicle rounds a curve.

FIGS. 17A to 17D are diagrams illustrating a traveling-amount calculation process when the vehicle rounds a curve. In FIG. 17A, the positional relationship among a feature point X of an object 850, a feature point Y of an object 851, and a center O of a camera is shown. As shown in FIG. 17A, an intersection of a vertical line extending from the feature point Y and a horizontal line extending from the feature point X is denoted by "W". The relative-position calculation unit 404 calculates a distance $Z_0$ from the center O to the feature point X, an angle $\theta_0$, a distance $Z_1$ from the center O to the feature point Y, and an angle $\theta_1$.

In this case, the traveling-amount calculation unit 704 obtains sides XW and YW using a trigonometric function in accordance with the following expressions.

$$XW=Z_1\sin\theta_1+Z_0\sin\theta_0=A1 \quad (5)$$

$$YW=Z_1\cos\theta_1-Z_0\cos\theta_0=B1 \quad (6)$$

The traveling-amount calculation unit 704 obtains a distance XY between the feature points X and Y of the objects 850 and 851 in accordance with the following expression.

$$XY=\mathrm{sqrt}(A12+B12)=C1 \quad (7)$$

The traveling-amount calculation unit 704 obtains angles $\alpha_0$ and $\alpha_1$ included in an angle OXY in accordance with the following expression.

$$\alpha_0=90-\theta_0 \quad (8)$$

$$\alpha_1=\cos-1(A1/C1) \quad (9)$$

Furthermore, the traveling-amount calculation unit 704 obtains an angle $\alpha_2$ representing an angle XYO in accordance with the following expression.

$$\alpha_2=\tan-1(A1/B1)-\theta_1 \quad (10)$$

By this, the traveling-amount calculation unit 704 calculates the relationship among the center O of the camera, the feature point X of the object 850, and the feature point Y of the object 851.

Figure 17B:
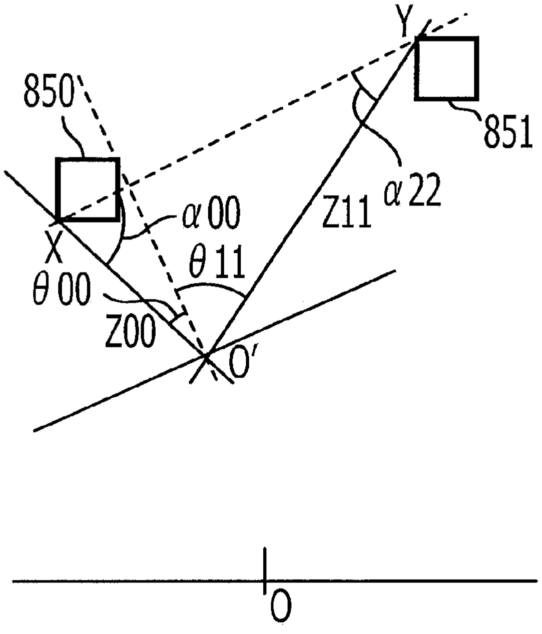

It is assumed that the vehicle rounds a curve in a period from the time point t0 to the time point t1 and a position of the center of the camera is shifted to a position O' at the time point t1. In FIG. 17B, the positional relationship among the feature point X of the object 850, the feature point Y of the object 851, and the center O' of a camera at the time point t1 is shown.

The relative-position calculation unit 404 calculates a distance $Z_{00}$ from the center O' to the feature point X, an angle $\theta_{00}$, a distance $Z_{11}$ from the center O' to the feature point Y, and an angle $\theta_{11}$. As with the case of FIG. 17A, the traveling-amount calculation unit 704 calculates angles $\alpha_{00}$ and $\alpha_{22}$ using the angles $\theta_{00}$, $\theta_{11}$, and the sides $Z_{00}$ and $Z_{11}$.

Figure 17C:
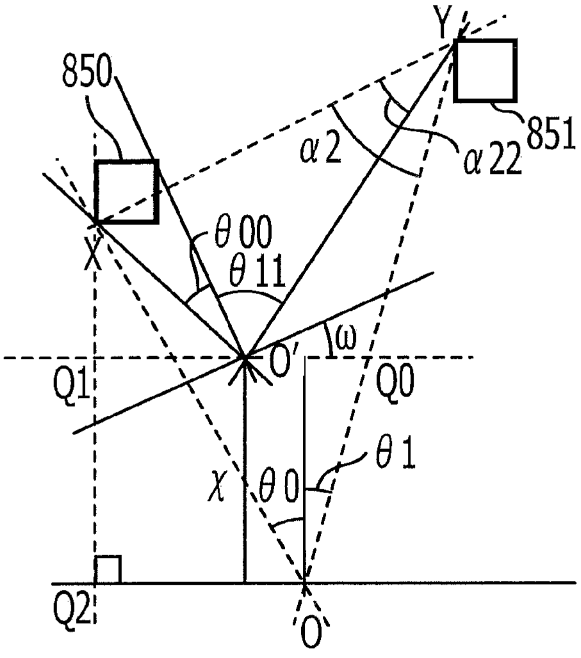

FIG. 17C is a diagram illustrating the positional relationship between the centers O and O'. The traveling-amount calculation unit 704 obtains a vertical distance x between the centers O and O' and an angle ω shown in FIG. 17C. First, to obtain the angle ω, a triangle $O'Q_0Y$ is focused on.

The traveling-amount calculation unit 704 obtains angles included in the triangle $O'Q_0Y$ by the following expressions.

$$\text{angle } O'YQ_0=\alpha_2-\alpha_{22} \quad (11)$$

$$\text{angle } O'Q_0Y=90+\theta_1 \quad (12)$$

$$\text{angle } YO'Q_0=\omega+90-\theta_{11} \quad (13)$$

The traveling-amount calculation unit 704 obtains the angle ω by the following expressions utilizing the fact that a sum of all angles of a triangle is 180°.

$$180=\alpha_2-\alpha_{22}+90+\theta_1+\omega+90-\theta_{11} \quad (14)$$

$$\omega=\theta_{11}-\theta_1+(\alpha_{22}-\alpha_2) \quad (15)$$

Next, the traveling-amount calculation unit 704 obtains the vertical direction x. The vertical direction x is equal to a side $Q_1Q_2$. Here, a triangle $O'XQ_1$ is focused on. The traveling-amount calculation unit 704 calculates an angle $XO'Q_1$ by the following expression.

$$\text{angle } XO'Q_1=90-\theta_{00}-\omega \quad (16)$$

The traveling-amount calculation unit 704 calculates a side $X'Q_1$ by the following expression.

$$XQ_1=Z_{00}\sin(90-\theta_{00}-\omega) \quad (17)$$

The traveling-amount calculation unit 704 focuses a triangle $OXQ_2$ and obtains a side $XQ_2$ by the following expression.

$$XQ_2=Z_{00}\sin(90-\theta_0) \quad (18)$$

The traveling-amount calculation unit 704 calculates the vertical distance x by the following expression.

$$x=XQ_2-XQ_1=Z_0\sin(90-\theta_0)-Z_{00}\sin(90-\theta_{00}-\omega) \quad (19)$$

By this, the traveling-amount calculation unit 704 obtains the turning angle ω and the vertical distance x from the center O to the center O' of the traveling vehicle.

Figure 17D:
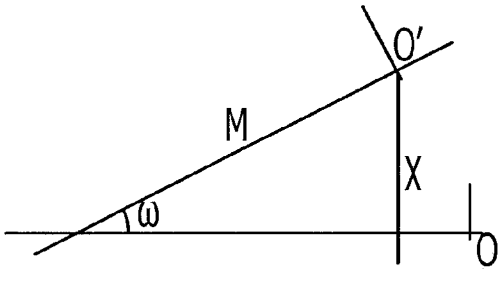

In FIG. 17D, the relationship among the rotation radius M, the vertical distance x, and the turning angle ω. After obtaining the turning angle ω and the vertical distance x, the traveling-amount calculation unit 704 obtains the rotation radius M by the following expression.

$$M=x/\sin \omega \quad (20)$$

In this way, the traveling-amount calculation unit 704 obtains the turning angle ω and the rotation radius M. The traveling-amount calculation unit 704 may further obtain an angle velocity by dividing the turning angle ω by a difference between the time points t1 and t0. Furthermore, the traveling-amount calculation unit 704 may consecutively calculate angle velocities at a regular interval and obtain shifts of the angle velocities to thereby obtain angular acceleration. The regular interval is 100 ms, for example.

The traveling-amount calculation unit 704 determines whether a traveling amount at a time when the vehicle is traveling straight or a traveling amount at a time when the vehicle is rounding a curve is obtained in accordance with a result of the determination of the flow as described above.

Operation

Figure 18:
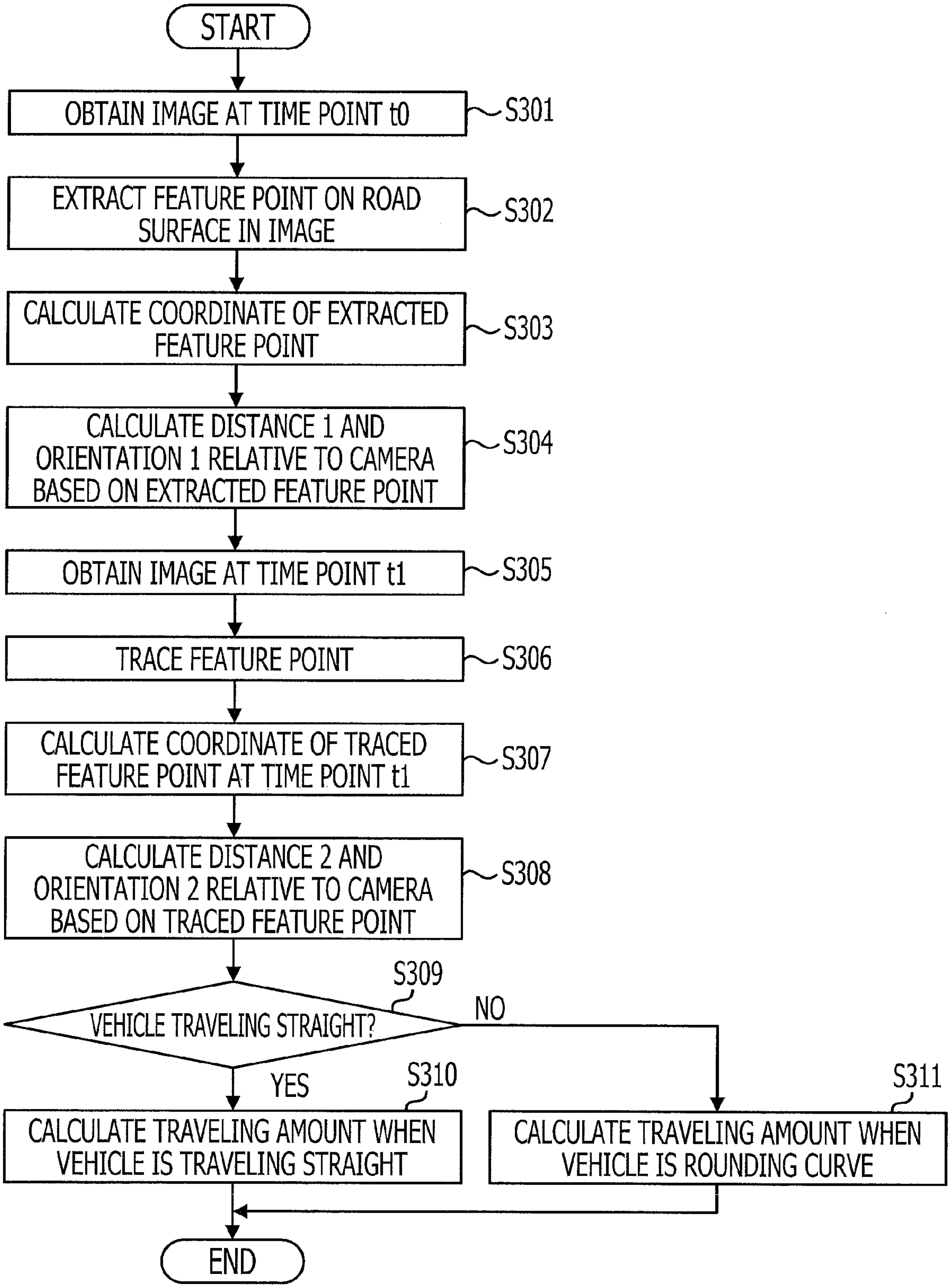
FIG. 18 is a flowchart illustrating a traveling-amount calculation process according to the third embodiment.

Next, operation of the distance calculation apparatus 30 of the third embodiment will be described. FIG. 18 is a flowchart illustrating the traveling-amount calculation process according to the third embodiment. A process from operation S301 to operation S308 is the same as the process from operation S201 to operation S208 shown in FIG. 11, and therefore, a description thereof is omitted.

In operation S309, the flow determination unit 703 calculates lateral vectors of certain feature points in two images. Thereafter, the flow determination unit 703 determines whether the vehicle is traveling straight in accordance with frequency distribution of the calculated lateral vectors of the feature points. A result of the determination is supplied to the traveling-amount calculation unit 704. When the result of the determination represents that the vehicle is traveling straight (when the determination is affirmative in operation S309), the traveling-amount calculation unit 704 performs an operation in operation S310 whereas when the result of the determination represents that the vehicle is rounding a curve (when the determination is negative in operation S309), the traveling-amount calculation unit 704 performs an operation in operation S311.

In operation S310, the traveling-amount calculation unit 704 calculates a traveling amount of the vehicle which is traveling straight. The process of calculating the traveling amount at the time when the vehicle is traveling straight is the same as that described in the second embodiment.

In operation S311, the traveling-amount calculation unit 704 calculates a traveling amount of the vehicle which is rounding a curve. The process of calculating the traveling amount at the time when the vehicle is rounding a curve is the same as that described in the third embodiment.

As described above, according to the third embodiment, a determination as to whether a vehicle is traveling straight or rounding a curve is made and a traveling amount is obtained in accordance with the determination. Furthermore, the flow determination unit 703 may use motion vectors of feature points which are extracted by the first extraction unit 402 and traced by the first tracing unit 403. By this, a processing load is reduced.

Fourth Embodiment

Next, a distance calculation apparatus 40 according to a fourth embodiment will be described. In the fourth embodiment, assuming that a vehicle is traveling straight, a displacement of a traveling amount is obtained and a motion of the vehicle is determined in accordance with the obtained displacement of the traveling amount. The distance calculation apparatus 40 has a function of calculating a traveling amount, and therefore, serves as a traveling-amount calculation apparatus.

Configuration

Figure 19:
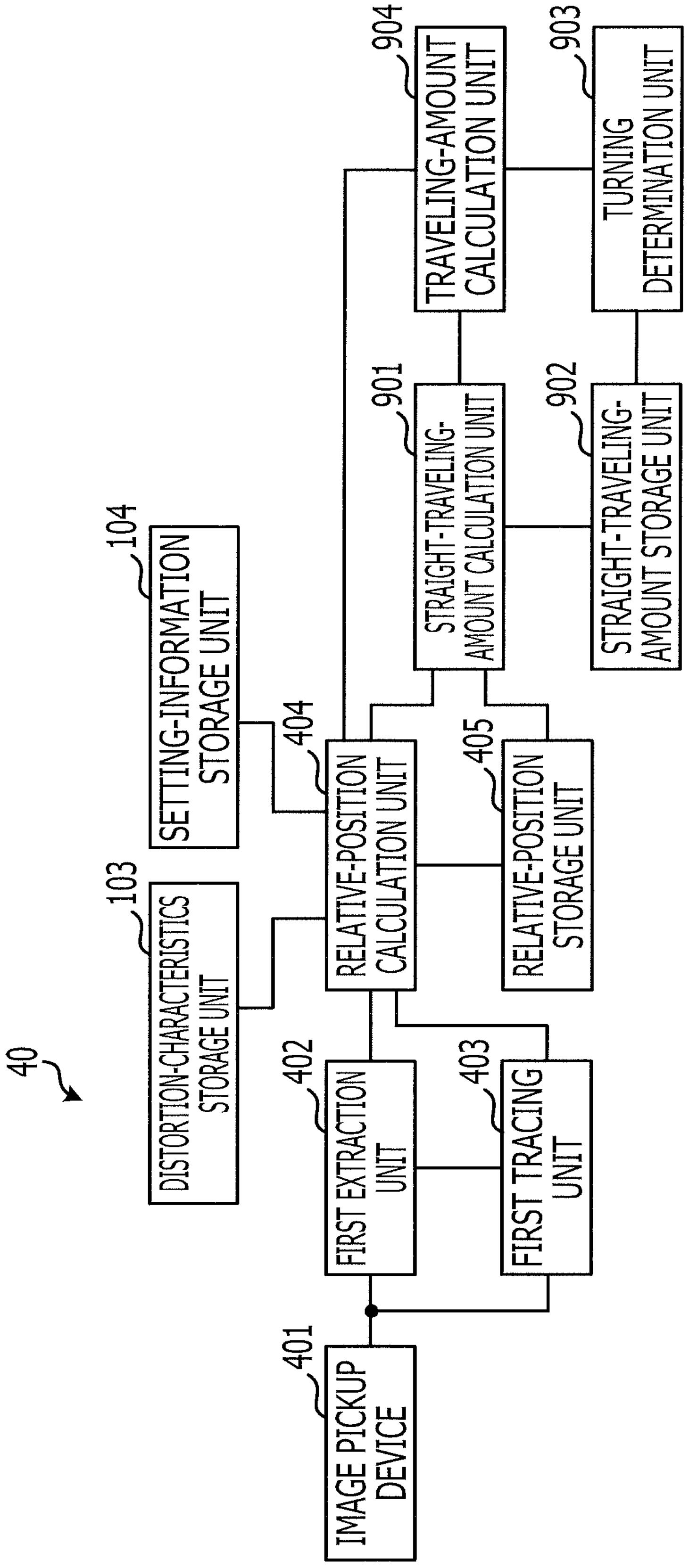
FIG. 19 is a block diagram illustrating a configuration of a distance calculation apparatus according to a fourth embodiment.

FIG. 19 is a block diagram illustrating a configuration of the distance calculation apparatus 40 according to the fourth embodiment. In the example shown in FIG. 19, the distance calculation apparatus 40 includes an image pickup device 401, a first extraction unit 402, a first tracing unit 403, a distortion-characteristics storage unit 103, a setting-information storage unit 104, a relative-position calculation unit 404, and a relative-position storage unit 405. The distance calculation apparatus 40 further includes a straight-traveling-amount calculation unit 901, a straight-traveling-amount storage unit 902, a turn determination unit 903, and a traveling-amount calculation unit 904. In the configuration shown in FIG. 19, components the same as those shown in FIGS. 1 and 8 are denoted by reference numerals the same as those shown in FIGS. 1 and 8, and descriptions thereof are omitted.

The straight-traveling-amount calculation unit 901 performs operation the same as that performed by the traveling-amount calculation unit 406 in the second embodiment. The straight-traveling-amount calculation unit 901 obtains a traveling amount while assuming that the vehicle is traveling straight. The straight-traveling-amount calculation unit 901 supplies the obtained traveling amount to the traveling-amount calculation unit 904 and the straight-traveling-amount storage unit 902.

The straight-traveling-amount storage unit 902 stores the traveling amount calculated by the straight-traveling-amount calculation unit 901. Note that the traveling amount represents information including a traveling distance and a traveling direction as described above.

The turn determination unit 903 extracts a plurality of traveling amounts which are lately obtained from among a plurality of traveling amounts stored in the straight-traveling-amount storage unit 902 and compares the extracted traveling amounts with one another. Thereafter, the turn determination unit 903 determines whether the vehicle is traveling straight or rounding a curve in accordance with directions of movements of feature points. When a motion vector v1 of the feature point P obtained in a period from a time point t0 to a time point t1 and a motion vector v2 of a feature point P obtained in a period from the time point t1 to a time point t2 are on the same line, for example, the turn determination unit 903 determines that the vehicle is traveling straight.

Note that it is not necessarily the case that the motion vectors v1 and v2 are on the same line and the turn determination unit 903 may determine that the vehicle is traveling straight when the motion vectors v1 and v2 are substantially in parallel to each other within a predetermined distance. When the motion vector v2 and the motion vector v1 are not on the same line, the turn determination unit 903 determines that the vehicle is rounding a curve.

By this, a determination as to whether the vehicle is traveling straight or rounding a curve may be made by a reduced calculation amount without calculating flows of feature points. The turn determination unit 903 supplies a result of the determination to the traveling-amount calculation unit 904.

When the result of the determination represents that the vehicle is traveling straight, the traveling-amount calculation unit 904 outputs the traveling amount obtained from the straight-traveling-amount calculation unit 901 whereas when the result of the determination represents that the vehicle is rounding a curve, the traveling-amount calculation unit 904 calculates a traveling amount at the time when the vehicle is rounding a curve. The calculated traveling amount is displayed in a display unit of the vehicle, for example.

Operation

Figure 20:
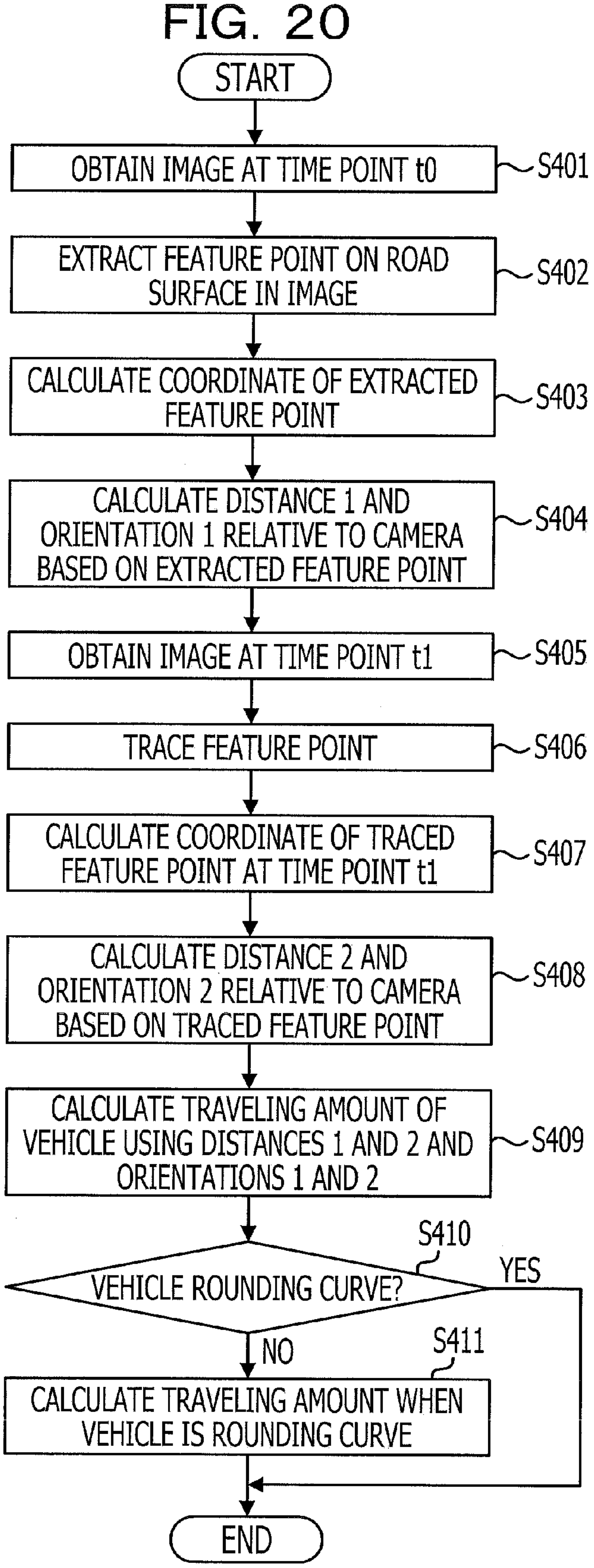
FIG. 20 is a flowchart illustrating a traveling-amount calculation process according to the fourth embodiment.

Next, operation of the distance calculation apparatus 40 of the fourth embodiment will be described. FIG. 20 is a flowchart illustrating a traveling-amount calculation process according to the fourth embodiment. A process from operation S401 to operation S409 shown in FIG. 20 is the same as the flow from operation S201 to operation S209 shown in FIG. 11, and therefore, a description thereof is omitted.

In operation S410, the turn determination unit 903 determines whether the vehicle is rounding a curve in accordance with a displacement of a traveling amount obtained when the vehicle is traveling straight. The turn determination unit 903 supplies a result of the determination to the traveling-amount calculation unit 904. When the result of the determination represents that the vehicle is rounding a curve (when the determination is affirmative in operation S410), the traveling-amount calculation unit 904 performs an operation in operation S411 whereas when the result of the determination represents that the vehicle is traveling straight (when the determination is negative in operation S410), the traveling-amount calculation unit 704 terminates the calculation process.

In operation S411, the traveling-amount calculation unit 904 calculates a traveling amount of the vehicle which is rounding a curve. The process of calculating the traveling amount is the same as that described in the third embodiment.

As described above, according to the fourth embodiment, a determination as to whether the vehicle is traveling straight or rounding a curve may be made by a reduced calculation amount without calculating flows of feature points.

Fifth Embodiment

Next, a distance calculation apparatus 50 according to a fifth embodiment will be described. In recent years, vehicles have a plurality of cameras including a camera for monitoring blind corners which is disposed in a front portion and a camera for back guide monitor which is disposed in a rear portion. Therefore, in the fifth embodiment, cameras are disposed in front and rear portions of a vehicle and a determination as to whether the vehicle is traveling straight or rounding a curve is made in accordance with images captured by the cameras. The distance calculation apparatus 50 has a function of calculating a traveling amount, and therefore, serves as a traveling-amount calculation apparatus.

Configuration

Figure 21:
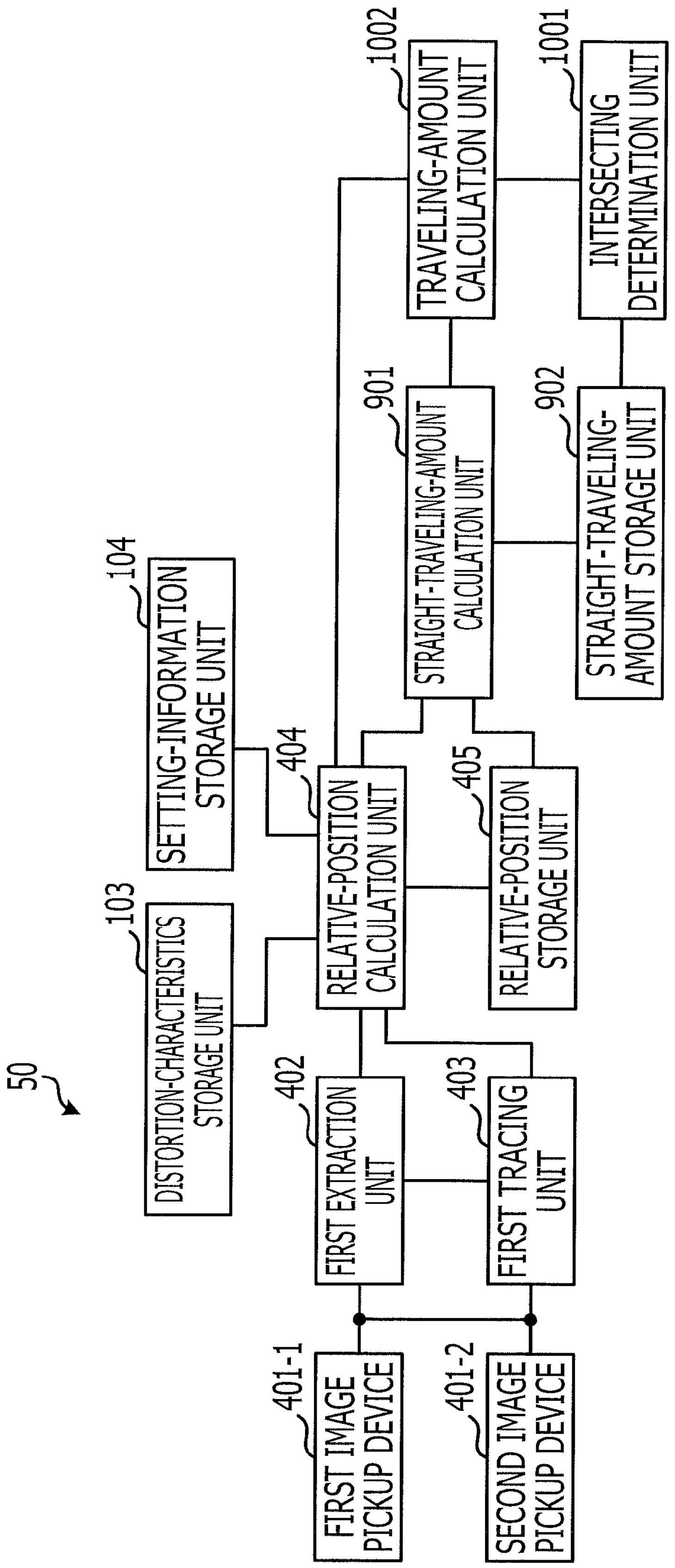
FIG. 21 is a block diagram illustrating a configuration of a distance calculation apparatus according to a fifth embodiment.

FIG. 21 is a block diagram illustrating a configuration of the distance calculation apparatus (traveling-amount calculation apparatus) 50 according to the fifth embodiment. In the example shown in FIG. 21, the distance calculation apparatus 50 includes first and second image pickup devices 401-1 and 401-2, a first extraction unit 402, a first tracing unit 403, a distortion-characteristics storage unit 103, a setting-information storage unit 104, a relative-position calculation unit 404, and a relative-position storage unit 405.

The distance calculation apparatus 50 further includes a straight-traveling-amount calculation unit 901, a straight-traveling-amount storage unit 902, an intersecting determination unit 1001, and a traveling-amount calculation unit 1002. In the configuration shown in FIG. 21, components the same as those shown in FIGS. 1, 8, and 19 are denoted by reference numerals the same as those shown in FIGS. 1, 8, and 19.

The first image pickup device 401-1 is a camera disposed in a front portion of the vehicle, for example, and the second image pickup device 401-2 is a camera disposed in a rear portion of the vehicle, for example. Note that the first extraction unit 402, the first tracing unit 403, the relative-position calculation unit 404, the relative-position storage unit 405, and the straight-traveling-amount calculation unit 901 independently operate respective processes in each camera. The straight-traveling-amount storage unit 902 stores a traveling amount of a vehicle which is traveling straight for each camera.

The intersecting determination unit 1001 obtains an amount of a movement of the front camera in accordance with an amount of a movement of the first image pickup device 401-1 moving straight which is stored in the straight-traveling-amount storage unit 902. The intersecting determination unit 1001 obtains an amount of a movement of the rear camera in accordance with an amount of a movement of the second image pickup device 401-2 moving straight which is stored in the straight-traveling-amount storage unit 902. Note that a traveling amount represents information including a traveling distance and a traveling direction as described above.

The intersecting determination unit 1001 determines whether directions of the movement amounts of the cameras are parallel to each other. When a difference between the directions of the movement amounts of the cameras is smaller than a threshold value, for example, the intersecting determination unit 1001 determines that the vehicle is traveling straight whereas when the difference is equal to or larger than the threshold value, the intersecting determination unit 1001 determines that the vehicle is rounding a curve.

Figure 22A:
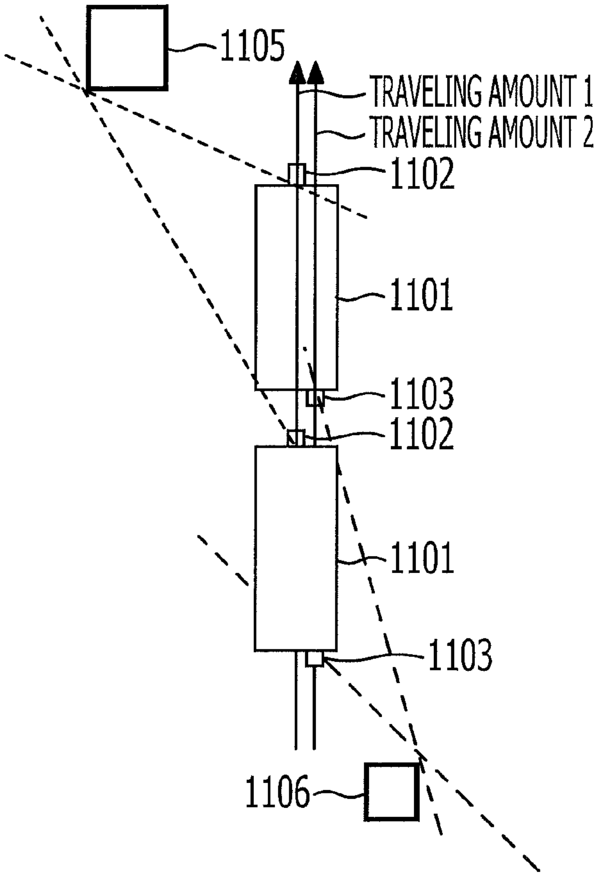
FIGS. 22A and 22B are diagrams illustrating amounts of movements of cameras.
Figure 22B:
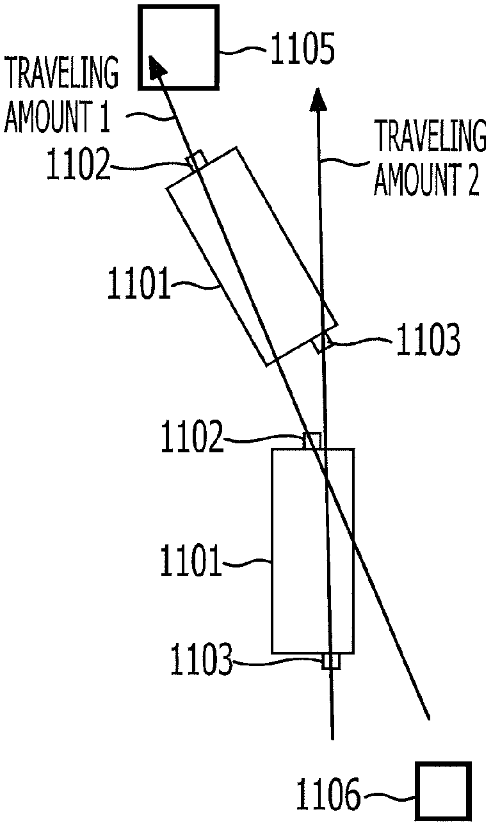

FIGS. 22A and 22B are diagrams illustrating movement amounts of cameras. In FIG. 22A, movement amounts of front and rear cameras 1102 and 1103 of a vehicle 1101 which is traveling straight are shown. In FIG. 22B, movement amounts of the front and rear cameras 1102 and 1103 of the vehicle 1101 which is rounding a curve are shown.

An image captured by the front camera 1102 includes an object 1105. A movement amount 1 of the front camera 1102 is calculated in accordance with a distance between a feature point of the object 1105 and the front camera 1102 at a time point t0 and a distance from the feature point of the object 1105 and the front camera 1102 at a time point t1.

An image captured by the rear camera 1103 includes an object 1106. A movement amount 2 of the rear camera 1103 is calculated in accordance with a distance between a feature point of the object 1106 and the rear camera 1103 at the time point t0 and a distance from the feature point of the object 1106 and the rear camera 1103 at the time point t1.

In the example shown in FIG. 22A, since a direction of the movement amount 1 of the front camera 1102 is the same as that of the movement amount 2 of the rear camera 1103, the intersecting determination unit 1001 determines that the vehicle is traveling straight.

In the example shown in FIG. 22B, since a direction of the movement amount 1 of the front camera 1102 is different from a direction of the movement amount 2 of the rear camera 1103 (that is, vectors intersect with each other), the intersecting determination unit 1001 determines that the vehicle is rounding a curve. The intersecting determination unit 1001 supplies a result of the determination to the traveling-amount calculation unit 1002.

When the result of the determination represents that the vehicle is traveling straight, the traveling-amount calculation unit 1002 outputs the traveling amount obtained from the straight-traveling-amount calculation unit 901 whereas when the result of the determination represents that the vehicle is rounding a curve, the traveling-amount calculation unit 1002 calculates a traveling amount at the time when the vehicle is rounding a curve as described in the third embodiment. The calculated traveling amount is displayed in a display unit of the vehicle, for example.

Operation

Next, operation of the distance calculation apparatus 50 of the fifth embodiment will be described. A traveling-amount calculation process of the fifth embodiment is the same as that shown in FIG. 20. In the fifth embodiment, a process from operation S401 to operation S409 is performed for each camera and the determination as to whether the vehicle is rounding a curve performed in operation S410 is made by the intersecting determination unit 1001.

As described above, according to the fifth embodiment, the determination as to whether the vehicle is traveling straight or rounding a curve is made in accordance with the images captured by the cameras which are disposed in the front and rear portions of the vehicle, for example. Note that, in the fifth embodiment, the determination as to whether the vehicle is traveling straight or rounding a curve may be made in accordance with a difference between flows of the objects captured by the cameras.

When the vehicle is traveling straight, the object captured by the front camera flows from inside to outside (refer to FIG. 13). On the other hand, the object captured by the rear camera gradually goes away and therefore is viewed as if the object becomes smaller toward a vanishing point. In this case, a dominant direction of the flow is a direction from outside to inside which is opposite to the flow of the object captured by the front camera.

When the vehicle is rounding a curve, a direction of a flow of the object captured by the front camera and a direction of a flow of the object captured by the rear camera are the same as each other. Therefore, the distance calculation apparatus 50 estimates whether the vehicle is traveling straight or vehicle is rounding a curve in accordance with a difference between the directions of the flows of the objects captured by the front and rear cameras, and calculates a traveling amount at the time when the vehicle is traveling straight or when the vehicle is rounding a curve in accordance with a result of the estimation. In the fifth embodiment, a plurality of video images are used, and therefore, the estimation as to whether a vehicle is traveling straight or rounding a curve may be made with higher accuracy when compared with a case where only one camera is used.

Sixth Embodiment

Figure 23:
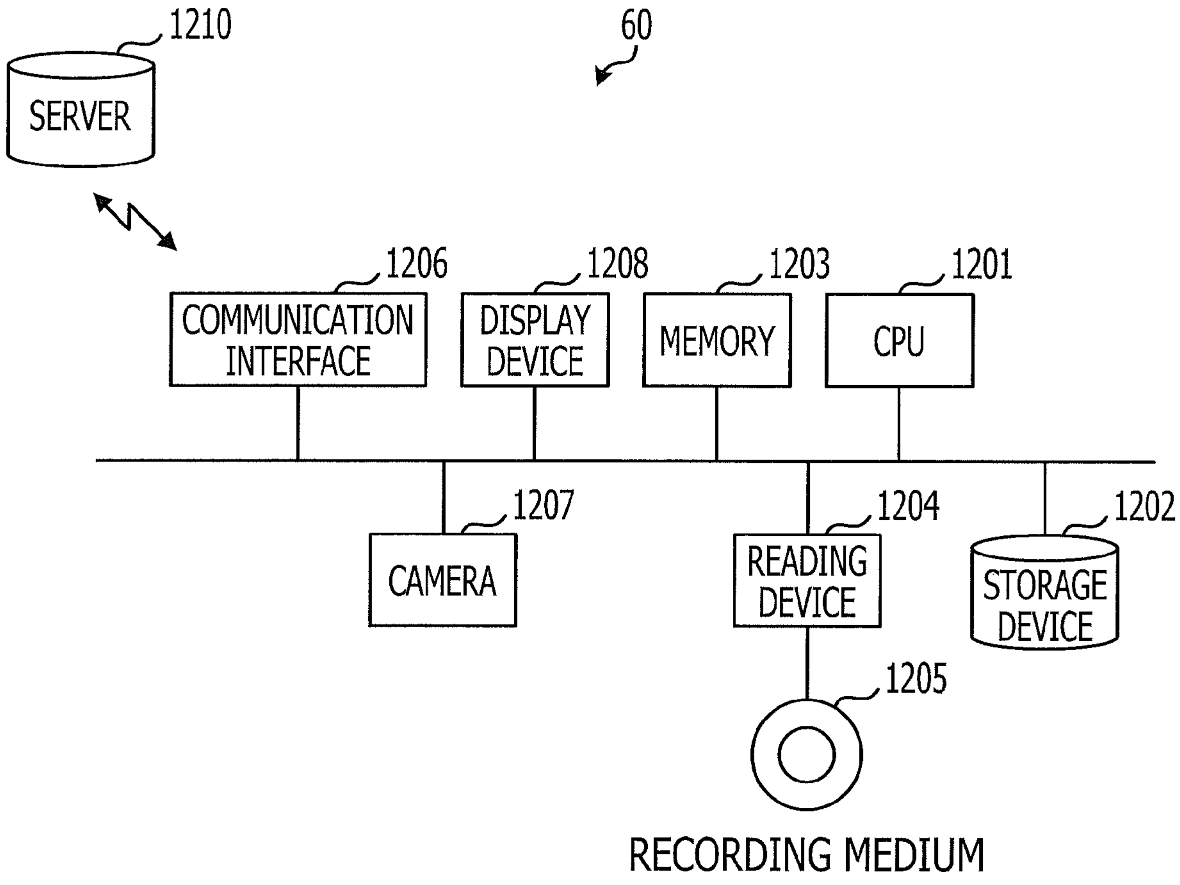
FIG. 23 is a block diagram illustrating a hardware configuration of an information processing apparatus according to the first to fifth embodiments.

FIG. 23 is a block diagram illustrating a hardware configuration of an information processing apparatus 60 according to the first to fifth embodiments. The information processing apparatus 60 shown in FIG. 23 includes a CPU 1201, a storage device 1202, a memory 1203, a reading device 1204, a communication interface 1206, a camera 1207, and a display device 1208. The information processing apparatus 60 is installed in a vehicle.

The CPU 1201 performs control of the devices, calculation of data, and data processing. The CPU 1201 executes a distance calculation program and a traveling-amount calculation program using the memory 1203.

The storage device 1202 is an HDD (Hard Disk Drive), for example, and stores data associated with application software. The storage device 1202 stores a distance calculation program and a traveling-amount calculation program, for example. Note that the storage device 1202 may be an external recording device.

The memory 1203 is a ROM (Read Only Memory) or a RAM (Random Access Memory), for example. The memory 1203 serves as a storage device which permanently or temporarily stores programs and data of an OS which is basic software and application software which are to be executed by the CPU 1201, for example.

The reading device 1204 accesses a portable recording medium 1205 in accordance with an instruction issued by the CPU 1201. Examples of the recording medium 1205 include a semiconductor device (such as a PC card), a medium to which information is input and from which information is output utilizing magnetic action, and a medium to which information is input and from which information is output utilizing optical action.

The communication interface 1206 transmits and receives data through a network in accordance with an instruction issued by the CPU 1201. At least one camera 1207 is disposed on the vehicle and captures an image of a road surface. The display device 1208 is a display unit included in the vehicle.

Note that, the CPU 1201 functions as the extraction unit, the tracing unit, the relative-position calculation unit, the traveling-amount calculation unit, the feature-point extraction unit, the feature-point tracing unit, the flow determination unit, the straight-traveling-amount calculation unit, and the intersecting determination unit in each of the foregoing embodiments. The image pickup device is the camera 1207, for example. The distortion-characteristics storage unit 103 and the setting-information storage unit 104 correspond to the storage device 1202, for example. The relative-position storage unit and the straight-traveling-amount storage unit correspond to the memory 1203, for example.

A distance calculation program and a traveling-amount calculation program according to the foregoing embodiments are provided as described below.

The programs are installed in the storage device 1202 in advance. The programs are provided by the recording medium 1205. The programs are downloaded from a program server 1210.

By executing the distance calculation program and the traveling-amount calculation program using the information processing apparatus 60 having one of the foregoing configurations, one of the apparatuses according to the foregoing embodiments is realized. However, the storage medium does not include a transitory medium such as a propagation signal.

Modifications

The case where a determination as to whether a vehicle is rounding a curve is made while it is assumed that the vehicle is traveling straight has been described in the foregoing embodiment. However, a determination as to whether the vehicle is traveling straight may be performed while it is assumed that the vehicle is rounding a curve. In this case, one of the determinations is selected in accordance with information processing capacity of the information processing apparatus 60 installed in the vehicle.

When an interval for calculating a traveling amount is short (in an interval of 100 ms, for example), a traveling amount may be calculated while it is assumed that the vehicle is traveling straight. In this case, as described above, when an orientation is shifted when compared with a preceding traveling amount, it is determined that the vehicle is rounding a curve.

When the interval for calculating a traveling amount is long (in an interval of one second, for example), a traveling amount may be calculated while it is assumed that the vehicle is rounding a curve. In this case, when a rotation radius M is equal to or larger than a threshold value, it may be determined that the vehicle is traveling straight. The threshold value is 2000 m, for example.

Note that a result of the determination as to whether the vehicle is traveling straight or rounding a curve may be used in an access-object detection process. In general, in the access-object detection process, although an object which accesses the vehicle may be appropriately detected when the vehicle is traveling straight, the object may not be appropriately detected when the vehicle is rounding a curve. Therefore, the access-object detection process may not be appropriately performed for a driver depending on a motion of the vehicle, and accordingly, it is considered that a notification of accuracy of the access-object detection process is effectively performed depending on the motion of the vehicle. Accordingly, when it is determined that the vehicle is rounding a curve in the foregoing embodiments and the modifications, information representing that the access-object detection process is terminated or is not appropriately performed may be displayed for the driver.

Furthermore, the result of the calculation of the traveling amount described above may be used for switching of navigation screens. For example, when a speed is lower than a predetermined speed, a video image captured by a front camera may be displayed in a display unit, and when the speed is equal to or higher than the predetermined speed, a navigation screen may be displayed in the display unit. The predetermined speed is 5 km/h, for example.

The embodiments have been described hereinabove. However, the present invention is not limited to the specific embodiments and various other modifications and changes may be made within the scope of the invention.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory storage medium storing a distance calculation program that causes a computer to execute a process, the process comprising:
- obtaining a first image captured by an image pickup device;
- extracting a first feature point which satisfies an extraction condition used to determine a point on a road surface in the first image; and
- calculating a first distance from the first feature point to the image pickup device in a real space in accordance with data obtained by associating a position of the point in the first image and a first angle of the point viewed from a center of the image pickup device in the real space, the position of the point in the first image being a distance represented by a number of pixels counted from a center of the first image, and setting information including an angle of depression of the image pickup device, an angle in a lateral direction of the image pickup device, a rotation angle of the image pickup device, and a distance between the image pickup device and the road surface.

2. The non-transitory storage medium according to claim 1, wherein the extracting includes:
- setting a region on which a process of extracting the first feature point is to be performed in an entire region of the first image in accordance with a vanishing point and a horizon included in the first image; and
- extracting at least one feature point from the region.

3. A non-transitory storage medium storing a distance calculation program that causes a computer to execute a process, the process comprising:
- obtaining a first image captured by an image pickup device;
- extracting a first feature point which satisfies an extraction condition used to determine a point on a road surface in the first image; and
- calculating a first distance from the first feature point to the image pickup device in a real space in accordance with data obtained by associating a position of the point in the first image and a first angle of the point viewed from a center of the image pickup device in the real space, and setting information including an angle of depression of the image pickup device and a distance between the image pickup device and the road surface, wherein the calculating includes:
  - calculating the first angle of the first feature point on the road surface relative to the image pickup device in the real space in accordance with the data and the position of the first feature point included in the first image; and
  - calculating the first distance in the real space in accordance with a trigonometric function calculation using the first angle of the first feature point and the setting information of the image pickup device.

4. The non-transitory storage medium according to claim 3, wherein the process further comprises:
- extracting a second feature point which satisfies the extraction condition from a second image which is captured by the image pickup device after the first image is captured;
- calculating, when the first feature point in the first image and the second feature point in the second image indicate the same feature point of the same object, a second distance from the second feature point to the image pickup device in the real space in accordance with the data and the setting information; and
- calculating a traveling amount of a vehicle in which the image pickup device is disposed in accordance with a difference between the first distance and the first angle obtained when the first image is captured and the second distance and a second angle obtained when the second image is captured.

5. The non-transitory storage medium according to claim 4,
- wherein the extracting the first feature point includes:
  - setting a first region on which a process of extracting the first feature point is to be performed in an entire region of the first image in accordance with a vanishing point and a horizon included in the first image; and
  - extracting at least one first feature point from the first region, and
- wherein the extracting the second feature point includes:
  - setting a second region larger than the first region in the second image; and
  - extracting at least one second feature point from the second region.

6. The non-transitory storage medium according to claim 4, wherein the process further comprises:
- determining a motion of the vehicle in accordance with an optical flow in the first image and an optical flow in the second image, and
- wherein the calculating the traveling amount includes:
  - calculating the traveling amount by a calculation method corresponding to the motion.

7. The non-transitory storage medium according to claim 6, wherein the determining the motion includes:

determining whether the vehicle is traveling straight or the vehicle is turning left or right, and wherein the calculating the traveling amount includes:

executing a traveling-amount calculation process to be performed at a time when the vehicle is traveling straight when it is determined that the vehicle is traveling straight; and executing a traveling-amount calculation process to be performed at a time when the vehicle is rounding a curve when it is determined that the vehicle is turning left or right.

8. The non-transitory storage medium according to claim 4, wherein the process further comprises:

determining a motion of the vehicle in accordance with the traveling amount, as a first traveling amount, obtained in accordance with the first and second images captured by the image pickup device serving as a first image pickup device and a second traveling amount obtained in accordance with images captured by a second image pickup device which is installed in the vehicle and which has setting information different from that of the first image pickup device.

9. A distance calculation apparatus comprising;

a processor to execute;

obtaining a first image captured by an image pickup device;

extracting a first feature point which satisfies an extraction condition used to determine a point on a road surface in the first image; and calculating a first distance from the extracted first feature point to the image pickup device in a real space in accordance with data obtained by associating a position of the point in the first image and an angle of the point viewed from a center of the image pickup device in the real space, the position of the point in the first image being a distance represented by a number of pixels counted from a center of the first image, and setting information including an angle of depression of the image pickup device, an angle in a lateral direction of the image pickup device, a rotation angle of the image pickup device, and a distance between the image pickup device and the road surface, and a memory, coupled to the processor, to store the data and the setting information.

10. The distance calculation apparatus according to claim 9, wherein the processor is configured, in the extracting, to set a region on which a process of extracting the first feature point is performed in an entire region of the first image in accordance with a vanishing point and a horizon included in the first image, and extract at least one feature point from the region.

11. A distance calculation apparatus comprising;

a processor to execute;

obtaining a first image captured by an image pickup device;

extracting a first feature point which satisfies an extraction condition used to determine a point on a road surface in the first image; and calculating a first distance from the extracted first feature point to the image pickup device in a real space in accordance with data obtained by associating a position of the point in the first image and an angle of the point viewed from a center of the image pickup device in the real space, and setting information including an angle of depression of the image pickup device and a distance between the image pickup device and the road surface, and a memory, coupled to the processor, to store the data and the setting information, wherein the processor is further configured, in the calculating, to calculate the first angle of the first feature point on the road surface relative to the image pickup device in the real space in accordance with the data and the position of the first feature point included in the first image, and calculate the first distance in the real space in accordance with a trigonometric function calculation using the first angle of the first feature point and the setting information of the image pickup device.

12. The distance calculation apparatus according to claim 11, wherein the processor is further configured to extract a second feature point which satisfies the extraction condition from a second image which is captured by the image pickup device after the first image is captured, calculate, when the first feature point in the first image and the second feature point in the second image indicate the same feature point of the same object, a second distance from the second feature point to the image pickup device in the real space in accordance with the data and the setting information, and calculate a traveling amount of a vehicle in which the image pickup device is disposed in accordance with a difference between the first distance and the first angle obtained when the first image is captured and the second distance and a second angle obtained when the second image is captured.

13. The distance calculation apparatus according to claim 12, wherein the processor is further configured to determine a motion of the vehicle in accordance with the traveling amount, as a first traveling amount, obtained in accordance with the first and second images captured by the image pickup device serving as a first image pickup device and a second traveling amount obtained in accordance with images captured by a second image pickup device which is installed in the vehicle and which has setting information different from that of the first image pickup device.

14. The distance calculation apparatus according to claim 12, wherein the processor is configured, in the extracting the first feature point, to set a region on which the process of extracting the first feature point is to be performed in an entire region of the first image in accordance with a vanishing point and a horizon included in the first image, and extract at least one feature point from the region, and the processor is configured, in the process of extracting the second feature point, to set a second region larger than the first region in the second image, and extract at least one second feature point from the second region.

15. The distance calculation apparatus according to claim 12, wherein the processor is further configured to determine a motion of the vehicle in accordance with an optical flow in the first image and an optical flow in the second image, and calculate the traveling amount by a calculation method corresponding to the motion in the process of calculating a traveling amount.

16. The distance calculation apparatus according to claim 15, wherein the processor is configured, in the determining the motion, to determine whether the vehicle is traveling straight or the vehicle is turning left or right, and the processor is configured, in the calculating a traveling amount, to execute a traveling-amount calculation process to be performed at a time when the vehicle is traveling straight when it is determined that the vehicle is traveling straight, and execute a traveling-amount calculation process to be performed at a time when the vehicle is rounding a curve when it is determined that the vehicle is turning left or right.

17. A method comprising:

obtaining a first image captured by an image pickup device;

extracting a first feature point which satisfies an extraction condition used to determine a point on a road surface in the first image; and calculating, by a processor, a first distance from the first feature point to the image pickup device in a real space in accordance with data obtained by associating a position of the point in the first image and a first angle of the point viewed from a center of the image pickup device in the real space, the position of the point in the first image being a distance represented by a number of pixels counted from a center of the first image, and setting information including an angle of depression of the image pickup device, an angle in a lateral direction of the image pickup device, a rotation angle of the image pickup device, and a distance between the image pickup device and the road surface.

18. The method according to claim 17, further comprising:

setting a region on which a process of extracting the first feature point is to be performed in an entire region of the first image in accordance with a vanishing point and a horizon included in the first image; and extracting at least one feature point from the region.

19. A method comprising:

obtaining a first image captured by an image pickup device;

extracting a first feature point which satisfies an extraction condition used to determine a point on a road surface in the first image; and calculating, by a processor, a first distance from the first feature point to the image pickup device in a real space in accordance with data obtained by associating a position of the point in the first image and a first angle of the point viewed from a center of the image pickup device in the real space, and setting information including an angle of depression of the image pickup device and a distance between the image pickup device and the road surface, wherein the calculating includes calculating the first angle of the first feature point on the road surface relative to the image pickup device in the real space in accordance with the data and the position of the first feature point included in the first image; and calculating the first distance in the real space in accordance with a trigonometric function calculation using the first angle of the first feature point and the setting information of the image pickup device.

20. The method according to claim 19, further comprising:

extracting a second feature point which satisfies the extraction condition from a second image which is captured by the image pickup device after the first image is captured;

calculating, when the first feature point in the first image and the second feature point in the second image indicate the same feature point of the same object, a second distance from the second feature point to the image pickup device in the real space in accordance with the data and the setting information; and calculating a traveling amount of a vehicle in which the image pickup device is disposed in accordance with a difference between the first distance and the first angle obtained when the first image is captured and the second distance and a second angle obtained when the second image is captured.

* * * * *

UNITED STATES PATENT AND TRADEMARK OFFICE

CERTIFICATE OF CORRECTION

PATENT NO. : 9,070,191 B2
APPLICATION NO. : 13/345945
DATED : June 30, 2015
INVENTOR(S) : Kimitaka Murashita It is certified that error appears in the above-identified patent and that said Letters Patent is hereby corrected as shown below:

ON THE TITLE PAGE

Item (54), Line 1

Delete "APARATUS" and insert --APPARATUS--, therefor.

IN THE SPECIFICATION

Column 1, Line 1

Delete "APARATUS" and insert --APPARATUS--, therefor.

Signed and Sealed this
Thirteenth Day of October, 2015

Michelle K. Lee
*Director of the United States Patent and Trademark Office*